US012604046B2

(12) United States Patent
Hsu et al.

(10) Patent No.: US 12,604,046 B2
(45) Date of Patent: Apr. 14, 2026

(54) SERVER AND TERMINAL

(71) Applicant: 17LIVE Japan Inc., Tokyo (JP)

(72) Inventors: Yung-Chi Hsu, Taipei City (TW);
Chun-Sheng Hsu, Taipei City (TW);
Chia-Han Chang, Taipei City (TW);
Chen-Hai Teng, Taipei City (TW);
Jhu-Kai Song, Taipei City (TW);
Yu-Chuan Chang, Taipei City (TW);
Chen-Yu Cheng, Taipei City (TW);
Po-Sheng Chiu, Taipei City (TW);
Cheng-Hsiang Weng, Taipei City
(TW); Shao-Tang Chien, Taipei City
(TW)

(73) Assignee: 17LIVE Japan Inc., Tokyo (JP)

( * ) Notice: Subject to any disclaimer, the term of this
patent is extended or adjusted under 35
U.S.C. 154(b) by 86 days.

(21) Appl. No.: 18/498,914

(22) Filed: Oct. 31, 2023

(65) Prior Publication Data

US 2024/0314368 A1 Sep. 19, 2024

(30) Foreign Application Priority Data

Mar. 19, 2023 (JP) ................................. 2023-043668

(51) Int. Cl.
*H04N 21/2187* (2011.01)
(52) U.S. Cl.
CPC ............................... *H04N 21/2187* (2013.01)
(58) Field of Classification Search
CPC ........................ H04N 21/2187; H04N 21/4882
See application file for complete search history.

(56) References Cited

U.S. PATENT DOCUMENTS

| | | | | |
|---|---|---|---|---|
| 10,038,673 | B1* | 7/2018 | Hensley | ................ H04L 63/029 |
| 2008/0225865 | A1* | 9/2008 | Herzog | ............. H04W 52/0229 |
| | | | | 370/392 |
| 2013/0086619 | A1* | 4/2013 | Martell | ................... H04L 65/65 |
| | | | | 725/114 |

FOREIGN PATENT DOCUMENTS

| | | |
|---|---|---|
| CN | 106488335 A | 3/2017 |
| CN | 112153399 A | 12/2020 |
| CN | 114025184 A | 2/2022 |

(Continued)

OTHER PUBLICATIONS

"Seven Things You Need to Know If You Want to Stream and
Livestream Games only using iPhone/Android," New! for begin-
ners, how to stream game plays on VIP, with English translation (26
pgs.). URL:https://vip-jikkyo.net/live-stream-from-a-smartphone.

(Continued)

*Primary Examiner* — Gigi L Dubasky
(74) *Attorney, Agent, or Firm* — MUNCY, GEISSLER,
OLDS & LOWE, P.C.

(57) ABSTRACT

A server includes a relay unit adapted to transmit a video
data related to a livestream from a terminal of a livestreamer
of the livestream to a terminal of a viewer, a determination
unit adapted to determine whether the livestream has been
terminated for an unexpected reason, a maintaining unit
adapted to maintain a state of the livestream when it is
determined that the livestream has been terminated, and a
resume unit adapted to resume the livestream with the
maintained state when the resume unit receives an instruc-
tion to resume the livestream from the terminal of the
livestreamer within a predetermined period after it is deter-
mined that the livestream has been terminated.

4 Claims, 18 Drawing Sheets

(56) References Cited

FOREIGN PATENT DOCUMENTS

| | | |
|---|---|---|
| CN | 114598916 A | 6/2022 |
| CN | 115514980 A | 12/2022 |

OTHER PUBLICATIONS

"Whisbi Help Center | Introduction," Aug. 2, 2021, https://web. archive.org/web/20210802160851/https:/helpcenter.whisbi.com/ broadcast-by-whisbi-android, retrieved Jun. 24, 2025, 4 pages.
"Whisbi Help Center | Recover session," Aug. 4, 2021, https://web. archive.org/web/20210804064218/https:/helpcenter.whisbi.com/ recover-session-android/, retrieved Jun. 24, 2025, 4 pages.
"Whisbi Help Center | Video Workflow," Aug. 2, 2021, https://web. archive.org/web/20210802151717/https:/helpcenter.whisbi.com/en/ it-developer/one-to-many-technical-information/video-workflow/, retrieved Jun. 24, 2025, 2 pages.

* cited by examiner

| Stream ID | Streamer ID | Viewer ID | Score | Stream Time | Number of Gifts | Number of Points | Participating Event ID | Event Score | Comment History | Tag | Number of Cheers | Number of Shares | Count Value | Timer | Status |
|---|---|---|---|---|---|---|---|---|---|---|---|---|---|---|---|
| ST22 | ABC | USR1, USR2, … | 356 | 0:12:30 | 56 | 12548 | EV001 | 25 | … | XX | 103 | 21 | 20 | 4:59 | Resumable |
| ST92 | DEF | USR5, USR6, … | 4158 | 1:20:34 | 128 | 584583 | EV002 | 458 | … | YY | 258 | 15 | 1 | NA | Streaming |
| | | | | | | | | | | | | | | | |

| User ID | Points | Reward |
|---------|--------|--------|
| ABC | 3243 | 1500 |
| DEF | 2510 | 800 |
| USR1 | 1803 | 0 |
| USR2 | 1305 | 0 |

| Gift ID | Reward | Price Points |
|---------|--------|--------------|
| TT01 | 90 | 100 |
| TE01 | 180 | 200 |

SERVER AND TERMINAL

CROSS-REFERENCE TO RELATED APPLICATIONS

This application is based on and claims the benefit of priority from Japanese Patent Application Serial No. 2023-43668 (filed on Mar. 19, 2023), the contents of which are hereby incorporated by reference in its entirety.

TECHNICAL FIELD

The present disclosure relates to a server and a terminal.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also became popular as storage costs were reduced. And nowadays or in the Reiwa period (2019 to present), with the sophistication of smartphones and further improvements in network speed as typified by 5G, services that enable real-time communication through video, especially livestreaming services, are gaining recognition. The number of users of livestreaming services is expanding, especially among young people, as such services allow people to share the same good time even when they are in the separate locations from each other.

The equipment used for livestreaming by a livestreamer side should have relatively high specifications in order to generate high-quality video in real time. For this reason, a livestreaming terminal was configured by installing dedicated software on a stationary PC with high specifications. With recent improvements in the performance of portable terminals such as smartphones, it is becoming possible to provide a livestream using a single smartphone (see, for example, "Seven things you need to know if you want to stream and livestream games only using iPhone/Android," New! for beginners, how to stream game plays on VIP, URL:https://vip-jikkyo.net/live-stream-from-a-smart-phone).

When you wish to livestream on your smartphone, the performance of smartphones varies widely and the connection is relatively unstable, which may result in interruption of the livestreaming abruptly for unexpected reasons. Unlike online conferences, livestreaming requires the livestreamer's ingenuity and effort to increase scores, gifts given, popularity, and viewers' engagement. If the livestream is interrupted or ended unintentionally, the livestreamer may lose those things he or she has built up in an instant. Such an interruption is a frustrating event for the livestreamer and so may discourage the livestreamer from continuing his/her livestreaming

SUMMARY

In view of the above, one object of the present disclosure is to provide a technology that can reduce losses even when livestreaming is interrupted for unexpected reasons.

One aspect of the disclosure relates to a server. The server includes a relay unit adapted to transmit a video data related to a livestream from a terminal of a livestreamer of the livestream to a terminal of a viewer, a determination unit adapted to determine whether the livestream has been terminated for an unexpected reason, a maintaining unit adapted to maintain a state of the livestream when it is determined that the livestream has been terminated, and a resume unit adapted to resume the livestream with the maintained state when the resume unit receives an instruction to resume the livestream from the terminal of the livestreamer within a predetermined period after it is determined that the livestream has been terminated.

Another aspect of the invention relates to a terminal of a livestreamer of a livestream. The terminal includes one or more processors, and memory storing one or more computer programs configured to be executed by the one or more processors. The one or more computer programs includes instructions for: transmitting video data related to the livestream to a server over a network; and displaying on a display a screen for asking the livestreamer whether to resume the livestream when the livestream is terminated for an unexpected reason.

Another aspect of the present disclosure relates to a terminal of a user reproducing video data. The terminal of the viewer includes one or more processors, and memory storing one or more computer programs configured to be executed by the one or more processors. The one or more computer programs includes instructions for: receiving video data related to the livestream from a server over a network; displaying a waiting request screen on a display without terminating the livestream on the terminal of the viewer when the livestream is terminated on the terminal of the livestreamer for an unexpected reason; displaying a remaining time on the waiting request screen; and terminating the livestream on the terminal of the viewer when the remaining time runs out without resumption of the livestream.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

According to the aspects of the present disclosure, it is possible to reduce losses even when livestreaming is interrupted for unexpected reasons.

BRIEF DESCRIPTION OF THE DRAWINGS

FIG. 4 is a data structure diagram showing, as an example, a stream DB shown in FIG. 3.

FIG. 6 is a data structure diagram showing, as an example, a user DB shown in FIG. 3.

FIG. 7 is a data structure diagram showing, as an example, a gift DB shown in FIG. 3.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a livestreaming system according to an embodiment, when a livestream is interrupted for an unexpected reason, a server maintains the state of the livestream for a resumable period. A livestreamer's user terminal asks the livestreamer whether to resume the interrupted livestream. When receiving an instruction to resume the livestream within the resumable period, the livestream is resumed from the state immediately before the interruption of the livestream. This allows the livestreamer to prevent their viewers from leaving and to continue his/her livestream while maintaining the previously accumulated scores, other parameters of the livestream, and the level of viewers' engagement.

The unexpected reasons may include, for example, failures in the livestreamer's user terminal (forced shutdown (crash) of the livestreaming application, discontinuation of the livestreaming application due to unintentional or faulty operation, etc.), failures in the network (network delay, network disconnection, poor wireless connection, etc.), and failures in the server (server error, overload, power failure, forced termination due to misconception by the monitor, etc.). The embodiment here mainly describes the case of forced shutdown of the livestreaming application on the livestreamer's user terminal. It is understood by those skilled in the art that the technical ideas of the embodiment can be applied to other types of reasons as well. Reception of the instruction from the livestreamer to stop the livestream is not included in the unexpected reasons.

Figure 1:
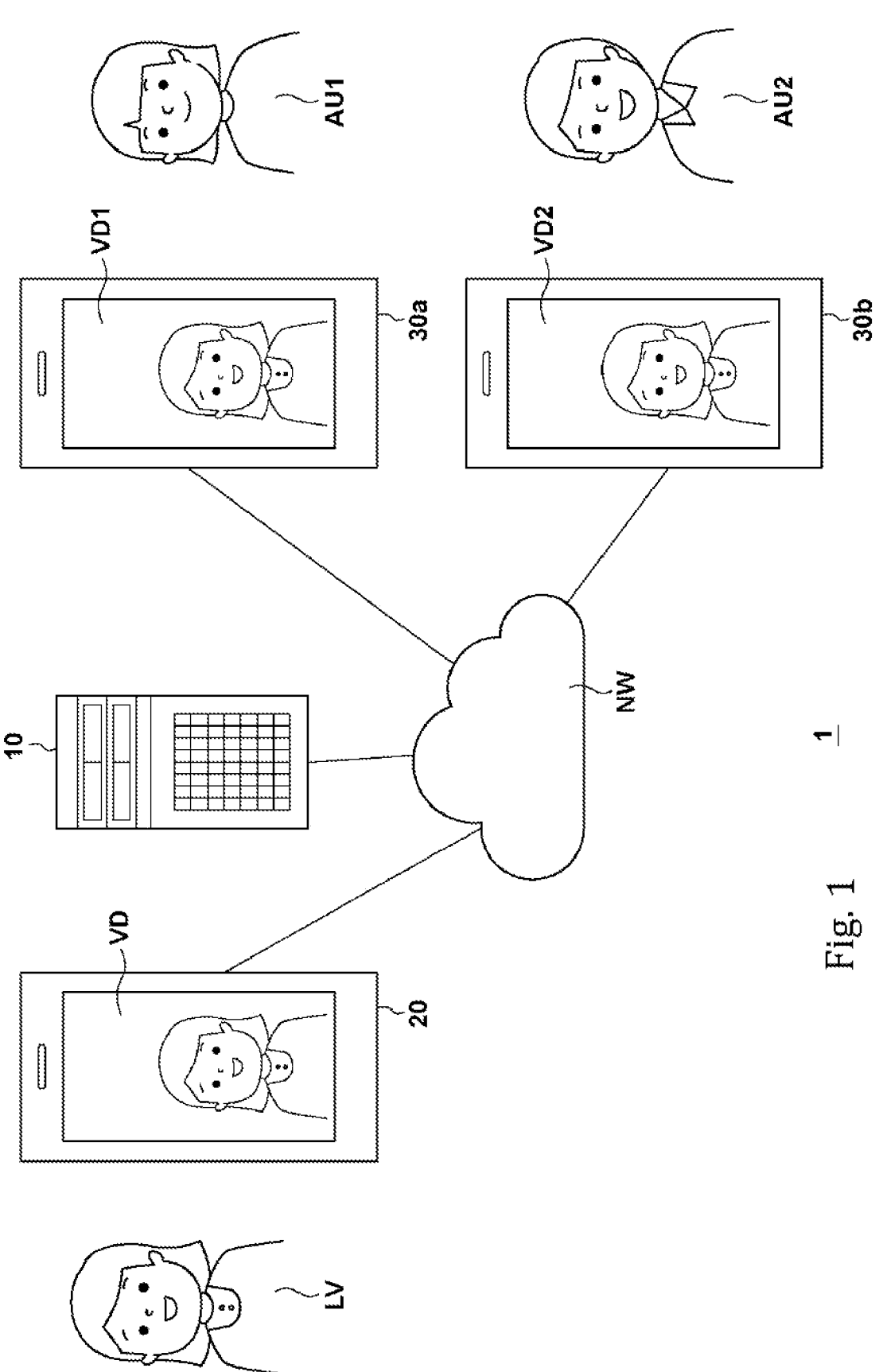
FIG. 1 schematically illustrates a configuration of a livestreaming system according to one embodiment of the disclosure.

FIG. 1 schematically illustrates the configuration of a livestreaming system 1 according one embodiment of the disclosure. The livestreaming system 1 provides an interactive livestreaming service that allows a livestreamer LV (also referred to as a liver or streamer) and a viewer AU (also referred to as audience) (AU1, AU2 . . . ) to communicate in real time. As shown in FIG. 1, the livestreaming system 1 includes a server 10, a user terminal 20 on the livestreamer side, and user terminals 30 (30a, 30b . . . ) on the audience side. In addition to the livestreamer who is livestreaming and the viewers who watch the live-stream, there may be users who have logged in the livestreaming platform but is neither livestreaming nor watching the livestream. Such users are referred to as active users. The livestreamer, the viewers, and the active users may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW.

The livestreaming system 1 involves the livestreamer LV, the viewers AU, and an administrator (not shown) who manages the server 10. The livestreamer LV is a person who broadcasts contents in real time by recording the contents with his/her user terminal 20 and uploading them directly to the server 1. Examples of the contents may include the livestreamer's own songs, talks, performances, fortune-telling, gameplays, and any other contents. The administrator provides a platform for livestreaming contents on the server 10, and also mediates or manages real-time interactions between the livestreamer LV and the viewers AU. The viewers AU access the platform at their user terminals 30 to select and view a desired content. During livestreaming of the selected content, the viewer AU performs operations to comment, cheer, or ask fortune-telling via the user terminal 30, the streamer LV who is delivering the content responds to such a comment, cheer, or request and such response is transmitted to the viewer AU via video and/or audio, thereby establishing an interactive communication.

As used herein, the term "livestreaming" or "livestream" may mean a mode of data transmission that allows a content recorded at the user terminal 20 of the livestreamer LV to be played and viewed at the user terminals 30 of the viewers AU substantially in real time, or it may mean a live broadcast realized by such a mode of transmission. The livestreaming may be achieved using existing livestreaming technologies such as HTTP Live Streaming, Common Media Application Format, Web Real-Time Communications, Real-Time Messaging Protocol and MPEG DASH. The livestreaming includes a transmission mode in which, while the livestreamer LV is recording contents, the viewers AU can view the contents with a certain delay. The delay is acceptable as long as interaction between the livestreamer LV and the viewers AU can be at least established. Note that the livestreaming is distinguished from so-called on-demand distribution, in which contents are entirely recorded and the entire data is once stored on the server and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view contents. In this embodiment, it is assumed that between video data generation at the livestreamer's user terminal and video data reproduction at the viewer's user terminal, processing is performed onto the video data to change its format, size, or specifications of the data, such as compression, decompression, encoding, decoding, or transcoding. However, such processing does not substantially change the content (e.g., video images and audios) represented by the video data, so that the video data after such processing is herein described as the same as the video data before such processing. In other words, when video data is generated at the livestreamer's user terminal and then played back at the viewer's user terminal via the server 10, the video data generated at the livestreamer's user terminal, the video data that passes through the server 10, and the video data received and reproduced at the viewer's user terminal are all the same video data.

As used herein, "livestream duration" is a parameter associated with a single livestream and refers to the length of time during which the livestream continues. The livestream duration is calculated irrespective of whether or not there are any viewers of the livestream.

In the example in FIG. 1, a livestreamer LV is livestreaming his/her talk. The user terminal 20 of the livestreamer LV generates video data by recording images and sounds of the livestreamer LV who is talking, and the generated data is transmitted to the server 10 over the network NW. At the same time, the user terminal 20 displays the recorded video image VD of the livestreamer LV on the display of the user terminal 20 to allow the livestreamer LV to check what is to be streamed.

The user terminals 30a and 30b of the viewers AU1 and AU2 respectively, who have requested the platform to enable them to view the livestream of the livestreamer LV, receive video data related to the livestream over the network NW and reproduce the received video data, to display video images VD1 and VD2 on the displays and output audio through the speakers. The video images VD1 and VD2 displayed at the user terminals 30a and 30b, respectively, are substantially the same as the video image VD captured by the user terminal 20 of the livestreamer LV, and the audio outputted at the user terminals 30a and 30b is substantially the same as the audio recorded by the user terminal 20 of the livestreamer LV.

Recording of the images and sounds at the user terminal 20 of the livestreamer LV and reproduction of the video data at the user terminals 30a and 30b of the viewers AU1 and AU2 are performed substantially simultaneously. The viewer AU1 may type a comment about the talk of the livestreamer LV on the user terminal 30a, and the server 10 may display the comment on the user terminal 20 of the livestreamer LV in real time and also display the comment on the user terminals 30a and 30b of the viewers AU1 and AU2, respectively. The livestreamer LV may read the comment and develop his/her talk to cover and respond to the comment, and the video and sound of the talk are output on the user terminals 30a and 30b of the viewers AU1 and AU2, respectively. This interactive action is recognized as establishment of a conversation between the livestreamer LV and the viewer AU1. In this way, the livestreaming system 1 realizes the livestreaming that enables the interactive communication, not one-way communication.

Figure 2:
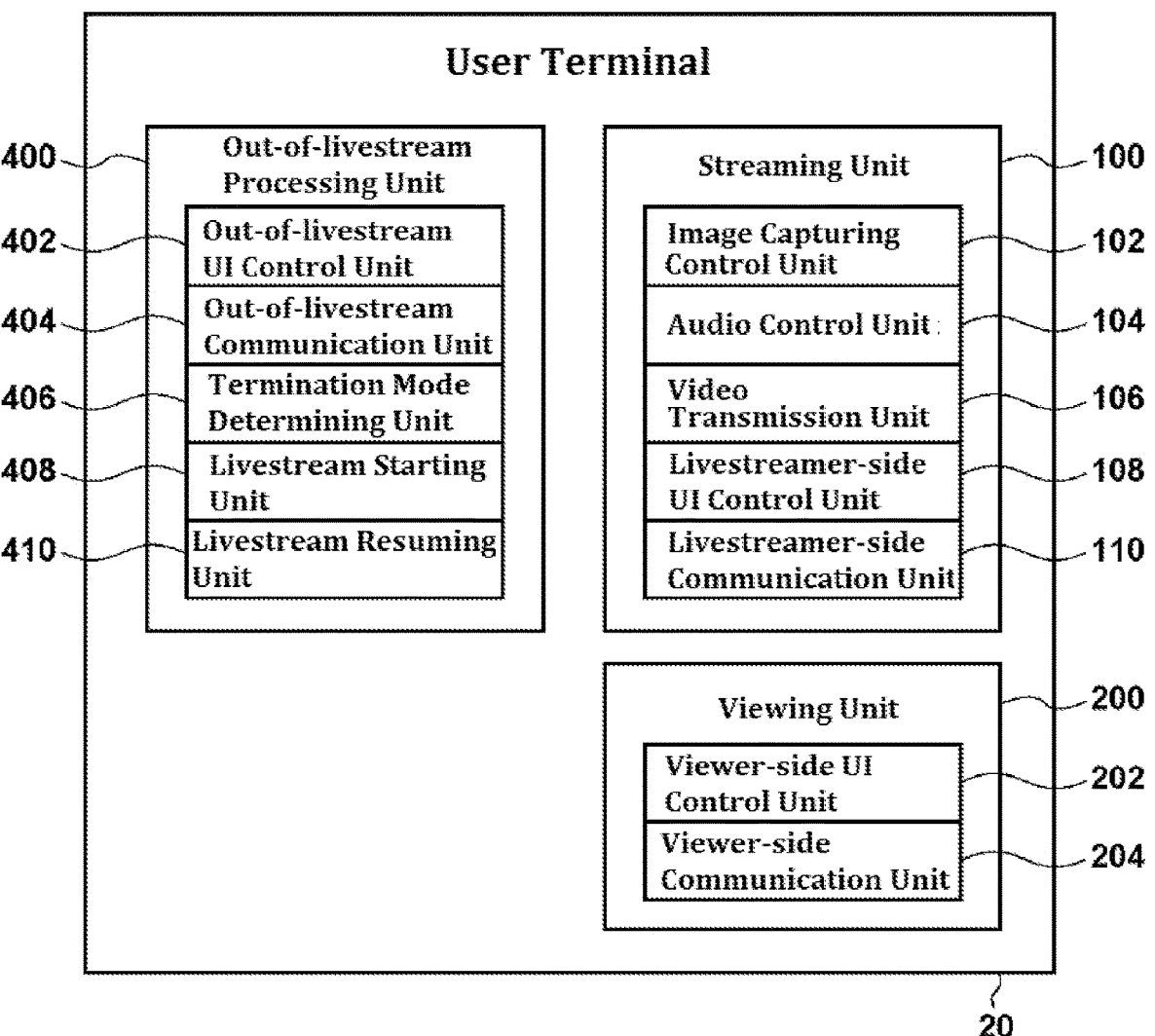
FIG. 2 is a block diagram showing functions and configuration of a user terminal of FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The livestreamer LV and the viewers AU download and install a livestreaming application program (hereinafter referred to as a livestreaming application), onto the user terminals 20 and 30 from a download site over the network NW. Alternatively, the livestreaming application may be pre-installed on the user terminals 20 and 30. When the livestreaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the livestreaming application will be described as functions of the user terminals 20 and 30. These functions are realized in practice by the livestreaming application on the user terminals 20 and 30. In any other embodiments, these functions may be realized by a computer program written in a programming language such as HTML (HyperText Markup Language), which is transmitted from the server 10 to web browsers of the user terminals 20 and 30 over the network NW and executed by the web browsers.

The user terminal 20 includes a streaming unit 100 for generating a video data in which the user's image and sound are recorded and providing the video data to the server 10, a viewing unit 200 for acquiring and reproducing the video data from the server 10, and an out-of-live-stream processing unit 400 for processing requests made by active users. The user activates the streaming unit 100 to livestream, the viewing unit 200 to view a livestream, and the out-of-livestream processing unit 400 to look for a livestream to watch, view a livestreamer's profile, watch an archive, or start a livestream.

The streaming unit 100 includes an image capturing control unit 102, an audio control unit 104, a video transmission unit 106, a streamer-side UI control unit 108, and a streamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The livestreamer-side UI control unit 108 controls a UI for the livestreamer. The livestreamer-side UI control unit 108 is connected to a display (not shown in FIG. 2), and displays a video on the display by reproducing the video data that is to be transmitted by the video transmission unit 106. The livestreamer-side UI control unit 108 is also connected to input means (not shown in FIG. 2) such as touch panels, keyboards, and displays, and obtains the livestreamer's input via the input means. The livestreamer-side UI control unit 108 superimposes a predetermined frame image on the video image. The frame image includes various user interface objects (hereinafter simply referred to as "objects") for receiving inputs from the livestreamer, comments entered by the viewers, and information obtained from the server 10. The livestreamer-side UI control unit 108 receives, for example, the livestreamer's inputs made by the livestreamer tapping the objects.

The livestreamer-side communication unit 110 controls communication with the server 10 during a livestream. The livestreamer-side communication unit 110 transmits the content of the livestreamer's input that has been obtained by the streamer-side UI control unit 108 to the server 10 over the network NW. The livestreamer-side communication unit 110 receives various information associated with the livestream from the server 10 over the network NW. The livestreamer-side communication unit 110 generates and transmits a keep-alive signal including a stream ID of the livestream periodically during the livestream to the server 10 over the network NW, for example, at intervals of 10 seconds. The user terminal 20 of the livestreamer repeatedly transmits the keep-alive signal during the livestream. When no livestreaming is performed on the user terminal 20, the keep-alive signal is not generated.

The viewing unit 200 includes a viewer-side UI control unit 202 and a viewer-side communication unit 204. The viewer-side communication unit 204 controls communication with the server 10 during a livestream. The viewer-side communication unit 204 receives, from the server 10 over the network NW, video data related to the livestream in which the livestreamer and the viewer participate.

The viewer-side UI control unit 202 controls the UI for the viewer. The viewer-side UI control unit 202 is connected to a display and a speaker (not shown in FIG. 2), and reproduces the received video data so that video images are displayed on the display and sounds are output through the speaker. The state where the images and sounds are respectively output through the display and speaker can be referred to as "the video data is reproduced". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for receiving inputs from the viewer, comments entered by the viewer, and information obtained from the server 10. The viewer-side communication unit 204 transmits the content of the viewer's input that has been obtained by the viewer-side UI control unit 202 to the server 10 over the network NW.

The out-of-livestream processing unit 400 includes an out-of-livestream UI control section 402, an out-of-livestream communication unit 404, a termination mode determining unit 406, a livestream starting unit 408, and a livestream resume unit 410. The out-of-live-stream UI control unit 402 controls a UI for the active user. For example, the out-of-live-stream UI control unit 402 generates a livestream selection screen and shows the screen on the display. The livestream selection screen presents a list of livestreams to which the active user is currently invited to participate to allow the active user to select a live stream. The out-of-live-stream UI control unit 402 generates a profile screen for any user and shows the screen on the display. The out-of-live-stream UI control unit 402 plays back an archived past live-stream, which is recorded and stored.

The out-of-livestream communication unit 404 controls communication with the server 10 that takes place outside a livestream. The out-of-live-stream communication unit 404 receives, from the server 10 over the network NW, information necessary to generate the livestream selection screen, information necessary to generate the profile screen, and archived data. The out-of-livestream communication unit 404 transmits the content of the active user's input to the server 10 over the network NW.

Immediately after the livestreaming application is opened on the user terminal 20, the termination mode determining unit 406 determines how the previous livestream performed by the livestreamer, who is the user of the user terminal 20, ended. The termination mode determining unit 406 inquires the server 10 over the network NW about the status of the previous livestream performed by the user of the user terminal 20. The termination mode determining unit 406 makes this inquiry by generating a status request including the user ID of the user of the user terminal 20 and sending it to the server 10. The server 10 searches for information on the livestream with the user ID included in the status request as the livestreamer ID, and when it does not exist, generates a status response including the status "End" indicating that the livestream has ended normally, and transmit the response to the user terminal 20 from which the inquiry has sent. Whereas when the information exists, the server 10 obtains the status of the livestream. In this case, the status obtained is "Resumable" or "Unstable" as described below. The server 10 generates the status response that includes the acquired status and the stream ID of the found livestream, and transmits it to the inquiring user terminal 20. When the status included in the status response is "Resumable," the termination mode determining unit 406 determines that the previous livestream is interrupted or terminated for an unexpected reason. Whereas when the status included in the status response is "End", the termination mode determining unit 406 determines that the previous livestream is ended normally.

The livestream starting unit 408 waits for an instruction by the user to start a new livestream, when the termination mode determining unit 406 determined that the previous livestream has ended normally. Upon reception of the instruction by the livestream starting unit 408, a process to start a new livestream is performed. The livestream starting unit 408 generates a start request including the user ID of the user and transmits it to the server 10 over the network NW.

When the termination mode determining unit 406 determined that the previous livestream has been interrupted or terminated for an unexpected reason, the livestream resume unit 410 generates and displays a resume inquiry screen to ask the livestreamer whether to resume the previous livestream or not on the display. When the instruction to resume is received on the resume inquiry screen, the livestream resume unit 410 generates a resume request including the stream ID of the livestream to be resumed (the stream ID included in the status response) and transmits it to the server 10 over the network NW. The livestream resume unit 410 cooperates with the server 10 to perform processing to resume the previous livestream.

Figure 3:
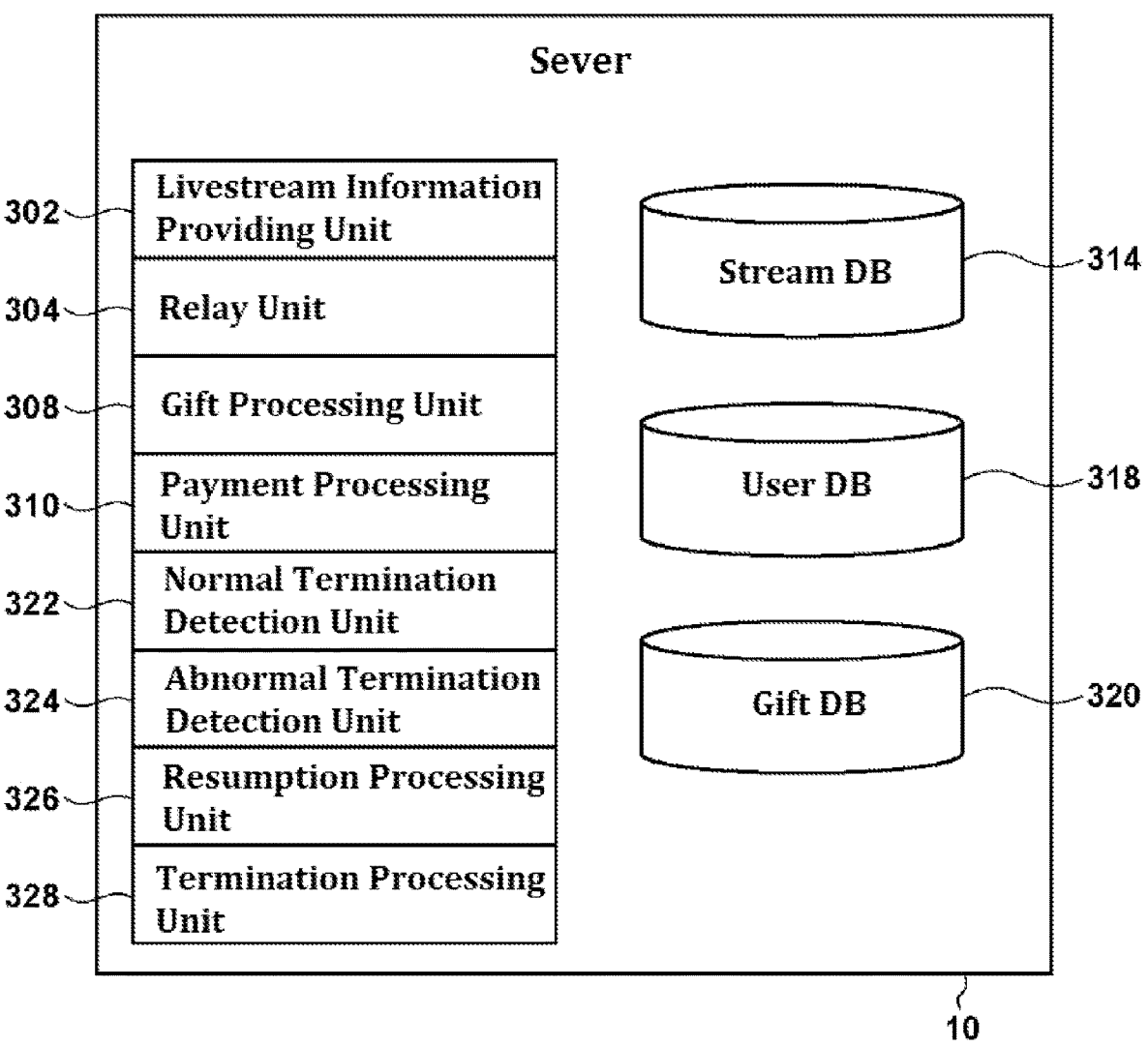
FIG. 3 is a block diagram showing functions and configuration of a server shown in FIG. 1.

FIG. 3 is a block diagram showing functions and configuration of the server 10 of FIG. 1. The server 10 includes a livestream information providing unit 302, a relay unit 304, a gift processing unit 308, a payment processing unit 310, a normal termination detection unit 322, an abnormal termination detection unit 324, a resumption processing unit 326, a termination processing unit 328, a stream DB 314, a user DB 318, and a gift DB 320.

FIG. 4 is a data structure diagram showing an example of the stream DB 314 of FIG. 3. The stream DB 314 holds information regarding livestreams that have not been terminated. The stream DB 314 stores an stream ID for identifying a livestream on a livestreaming platform provided by the livestreaming system 1, a livestreamer ID, which is a user ID for identifying the livestreamer who provides the livestream, a viewer ID, which is a user ID for identifying a viewer of the livestream, states of the livestream, a count value (described later) of the livestream, a server-side timer value (described later) of the livestream, and a status of the livestream, in association with each other.

The states of the livestream include a score, streaming time, the number of gifts used in the livestream, the number of points earned by the livestreamer in the livestream, an event ID for identifying an event in which the livestreamer is participating, an event score of the livestreamer in the event, a history of comments posted in the livestream, a tag indicating the content of the livestream, the number of yells sent in the livestream, and the number of times the livestream has been shared. The score is an indicator of viewers' engagement with the livestream. A livestream with a high score value is recognized as "lively" or "popular". The score varies depending on, for example, the number of viewers, streaming time, number of comments, number of shares, number of gifts received, number of viewers who gave gifts, and number of cheers. The higher the score, the higher or more prominent the thumbnail of that livestream is displayed on the livestream selection screen. Therefore, the higher the score, the livestream will catch the attention of more active users. The score is reset when the livestream ends. The tag of the livestream may be designated by the livestreamer when starting the livestream or obtained from real-time analysis of the livestream by a machine learning model. The cheer is a digital item given to the livestreamer by viewers and, unlike gifts, requires no payment for it. Once a cheer is sent, the viewer must wait a specified period of time before being able to give another cheer. The score, number of gifts earned, number of points earned, event score, tag, number of cheers, and number of times shared are examples of indicators of the performance of the livestreamer in the livestream.

In the livestreaming platform provided by the livestreaming system 1 of the embodiment, when a user livestreams, the user is referred to as a livestreamer, and when the same user views a livestream streamed by another user, the user is referred to as a viewer. Therefore, the distinction between a livestreamer and a viewer is not fixed, and a user ID registered as a livestreamer ID at one time may be registered as a viewer ID at another time.

The status of the livestream is one of the followings: "Streaming", which indicates that the livestream is in progress with a normal connection with the livestreamer's user terminal 20; "Unstable", which indicates that the livestream is in progress but the connection with the livestreamer's user terminal 20 cannot be confirmed; or "Resumable", which indicates that the livestream was interrupted on the livestreamer's user terminal 20 or server 10 for unexpected reasons but can be resumed. When the livestream is interrupted or terminated and cannot be resumed, the information on the relevant livestream is removed from the stream DB314.

Figure 5:
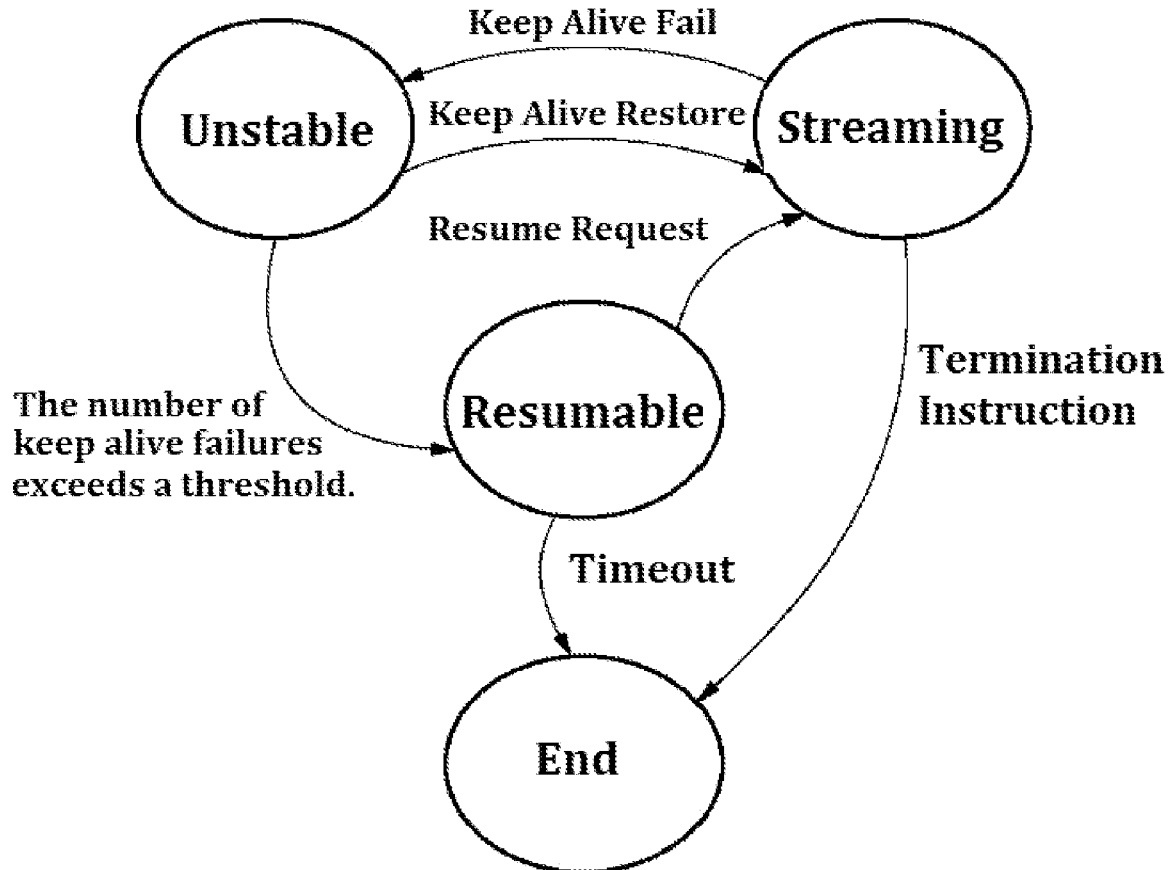
FIG. 5 is a status transition diagram of a livestream.

FIG. 5 is a status transition diagram of the livestream. When keep alive failed, the status changes from "Streaming" to "Unstable". When keep alive recovers, the status changes from "Unstable" to "Streaming". When the number of failures of keep alive exceeds a threshold while the status remains at "Unstable", the status changes from "Unstable" to "Resumable". In the "Resumable" state, keep alive is not monitored. When the resume request occurs before the resumable period expires, the status changes from "Resumable" to "Streaming". When the resumable period expires (timeout) without the resume request, the status changes from "Resumable" to "End" (deletion from the stream DB314). When the livestreamer intentionally instructs the termination of the livestream, the status changes from "Streaming" to "End".

FIG. 6 is a data structure diagram showing an example of the user DB 318 of FIG. 3. The user DB 318 holds information regarding users. The user DB 318 stores a user ID identifying a user, points owned by the user, and the reward awarded to the user, in association with each other. The points are an electronic representation of value circulated in the livestreaming platform. The user can purchase the points using a credit card or other means of payment. The reward is an electronic representation of value defined in the livestreaming platform and is used to determine the amount of money the livestreamer receives from the administrator of the livestreaming platform. In the livestreaming platform, when a viewer gives a gift to a livestreamer within or outside a livestream, the viewer's points are consumed and, at the same time, the livestreamer's reward is increased by a corresponding amount.

FIG. 7 is a data structure diagram showing an example of the gift DB 320 of FIG. 3. The gift DB 320 holds information regarding gifts available for the viewers in relation to the livestreaming. A gift is electronic data with the following characteristics:

It can be purchased in exchange for the points or money, or can be given for free.

It can be given by a viewer to a livestreamer. Giving a gift to a livestreamer is also referred to as using the gift or throwing the gift.

Some gifts may be purchased and used at the same time, and some gifts may be used by the viewer at any time after purchased.

When a viewer gives a gift to a livestreamer, the livestreamer is given a corresponding reward.

When a gift is used, the use may trigger an effect associated with the gift. For example, an effect corresponding to the gift will appear on the livestreaming room screen.

The gift DB 320 stores: a gift ID for identifying a gift; a reward to be awarded, which is a reward awarded to a livestreamer when the gift is given to the livestreamer; and price points, which is the amount of points to be paid for use of the gift, in association with each other. A viewer is able to give a desired gift to a livestreamer by paying the price points of the desired gift while viewing the livestream. The payment of the price points may be made by appropriate electronic payment means. For example, the payment may be made by the viewer paying the price points to the administrator. Alternatively, bank transfers or credit card payments may be available. The administrator is able to desirably set the relationship between the reward to be awarded and the price points. For example, it may be set as the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

Referring again to FIG. 3, upon reception of a request to start a livestream over the network NW from the user terminal 20 of the livestreamer, the stream information providing unit 302 registers in the stream DB 314 a stream ID identifying this livestream and the livestreamer ID of the livestreamer who performs the livestream. The stream ID is newly generated upon receipt of the start request. The livestreamer ID is set to the user ID included in the start request. When the stream information providing unit 302 receives a request for information about livestreams from the out-of-live-stream communication unit 404 of a user terminal of an active user over the network NW, the stream information providing unit 302 refers to the stream DB 314 and makes a list of currently available livestreams. The stream information providing unit 302 transmits the generated list to the requesting user terminal over the network NW. The out-of-live-stream UI control unit 402 of the requesting user terminal generates a livestream selection screen based on the received list and shows the livestream selection screen on the display of the user terminal.

Once the out-of-live-stream UI control unit 402 of the user terminal receives the active user's selection of a livestream on the livestream selection screen, the out-of-livestream UI control unit 402 generates a stream request including the stream ID of the selected livestream, and transmits the stream request to the server 10 over the network NW. The stream information providing unit 302 starts to provide, to the requesting user terminal, the livestream identified by the stream ID included in the received stream request. The stream information providing unit 302 updates the stream DB 314 such that the user ID of the active user of the requesting user terminal is included in the viewer IDs for the stream ID. In this way, the active user can become a viewer of the selected livestream.

The relay unit 304 relays the video data from the streamer-side user terminal 20 to the viewer-side user terminal 30 in the livestream started by the stream information providing unit 302. The relay unit 304 receives from the viewer-side communication unit 204 a signal that represents user input by a viewer during the livestream or reproduction of the video data. The signal that represents user input may be an object specifying signal for specifying an object displayed on the display of the user terminal 30, and the object specifying signal includes the viewer ID of the viewer, the livestreamer ID of the livestreamer of the livestream that the viewer watches, and an object ID that identifies the object. When the object is a gift icon, the object ID is the gift ID. The object specifying signal in that case is a gift use signal indicating that the viewer uses a gift for the livestreamer. Similarly, the relay unit 304 receives from the streamer-side communication unit 110 of the streaming unit 100 in the user terminal 20 a signal that represents user input by the livestreamer during reproduction of the video data, such as the object specifying signal.

The gift processing unit 308 updates the user DB 318 so as to increase the reward for the livestreamer depending on the reward to be awarded of the gift identified by the gift ID included in the gift use signal. Specifically, the gift processing unit 308 refers to the gift DB 320 to specify a reward to be awarded for the gift ID included in the received gift use signal. The gift processing unit 308 then updates the user DB 318 to add the specified reward to be awarded to the reward for the livestreamer ID included in the gift use signal.

The payment processing unit 310 processes payment of a price of the gift by the viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

The normal termination detection unit 322 and the abnormal termination detection unit 324 function as means to determine whether the livestream has been interrupted or terminated for unexpected reasons. When the normal termination detection unit 322 receives a request to terminate the livestream from the livestreamer's user terminal 20, it detects a normal termination of the livestream, i.e., a termination for a reason other than unexpected reasons.

The abnormal termination detection unit 324 detects an abnormal termination of the livestream for an unexpected reason by monitoring the communication status of the user terminal 20 of the livestreamer of the livestream. The abnormal termination detection unit 324 monitors a keep alive signal that is periodically transmitted from the user terminal 20 of the livestreamer during the livestream. When the abnormal termination detection unit 324 fails to receive the keep alive signal, it updates the stream DB 314 so that the status of the livestream is changed from "Streaming" to "Unstable". The abnormal termination detection unit 324 detects that the livestream has been interrupted for an unexpected reason when it fails to receive the keep alive signal for N consecutive times (N is an integer of 2 or more). The abnormal termination detection unit 324 updates the stream DB 314 so that the status of that livestream is changed from "Unstable" to "Resumable". N is a threshold or upper limit that defines the length of the "unstable" period and may be set as appropriate by the administrator. For example, N may be set to 5, 10, 20, 100, or the like. The length of the "unstable" period can be considered as a period for determining whether the status of the livestream should be changed to "Resumable". When the status is "Unstable," the livestream can be continued by checking the keep alive signal, but when the status is "Resumable," the livestreaming application must be restarted or the user must re-enter (join) the livestream in order to resume the livestream.

When the abnormal termination detection unit 324 determines that the livestream is interrupted or terminated for an unexpected reason, it transmits a waiting request notification to the user terminal 30 of the viewer of the livestream for displaying a waiting request screen to ask viewers to wait.

When the resumption processing unit 326 determines that the livestream has been interrupted or terminated for an unexpected reason, it maintains a state of the livestream registered in the stream DB 314. The resumption processing unit 326 does not remove the entry of the livestream pertaining to the termination. This can be said that the state of the livestream is maintained in contrast to the case where the termination processing unit 328 (described below) immediately removes the entry for the livestream that has been normally terminated. The resumption processing unit 326 may set the entry of the livestream to be prohibited from being updated as soon as it is determined that the livestream was interrupted or terminated for an unexpected reason.

When the resumption processing unit 326 receives an instruction from the livestreamer's user terminal 20 to resume the livestream within the resumable period after it is determined that the livestream was interrupted or terminated for an unexpected reason, the resumption processing unit 326 resumes the livestream such that the state of the livestream is carried over from the livestream before the termination. Once the resumption processing section 326 receives a resume request from the livestreamer's user terminal 20, it identifies in the stream DB 314 the entry corresponding to the stream ID included in the resume request (the livestream to be resumed). The resumption processing unit 326 updates the stream DB 314 so that the status of the livestream to be resumed is changed from "Resumable" to "Streaming". The resumption processing unit 326 resumes receiving video data from the user terminal 20 from which the resume request was sent, and transmits the received video data to the user terminals 30 of the viewers of the livestream to be resumed. The resumable period may be set by the administrator as appropriate. For example, the resumable period may be set to 5 minutes, 10 minutes, 1 hour, or the like.

When the livestream is resumed, the resumption processing unit 326 transmits a push notification to the user terminals 30 of the viewers who left the livestream during the period between when it was determined that the livestream was terminated for an unexpected reason and when the livestream was resumed, to inform that the livestream has resumed. This can be accomplished by making a list of such viewers at server 10 in advance.

When normal termination of the livestream is detected, the termination processing unit 328 removes the entry of the livestream from the stream DB 314. When the termination processing unit 328 does not receive an instruction to resume within the resumable period of the livestream or it receives an instruction of discontinuation, the termination processing unit 328 discards the state of the livestream held in the stream DB 314 by removing the entry of the livestream from the stream DB 314.

Figure 8:
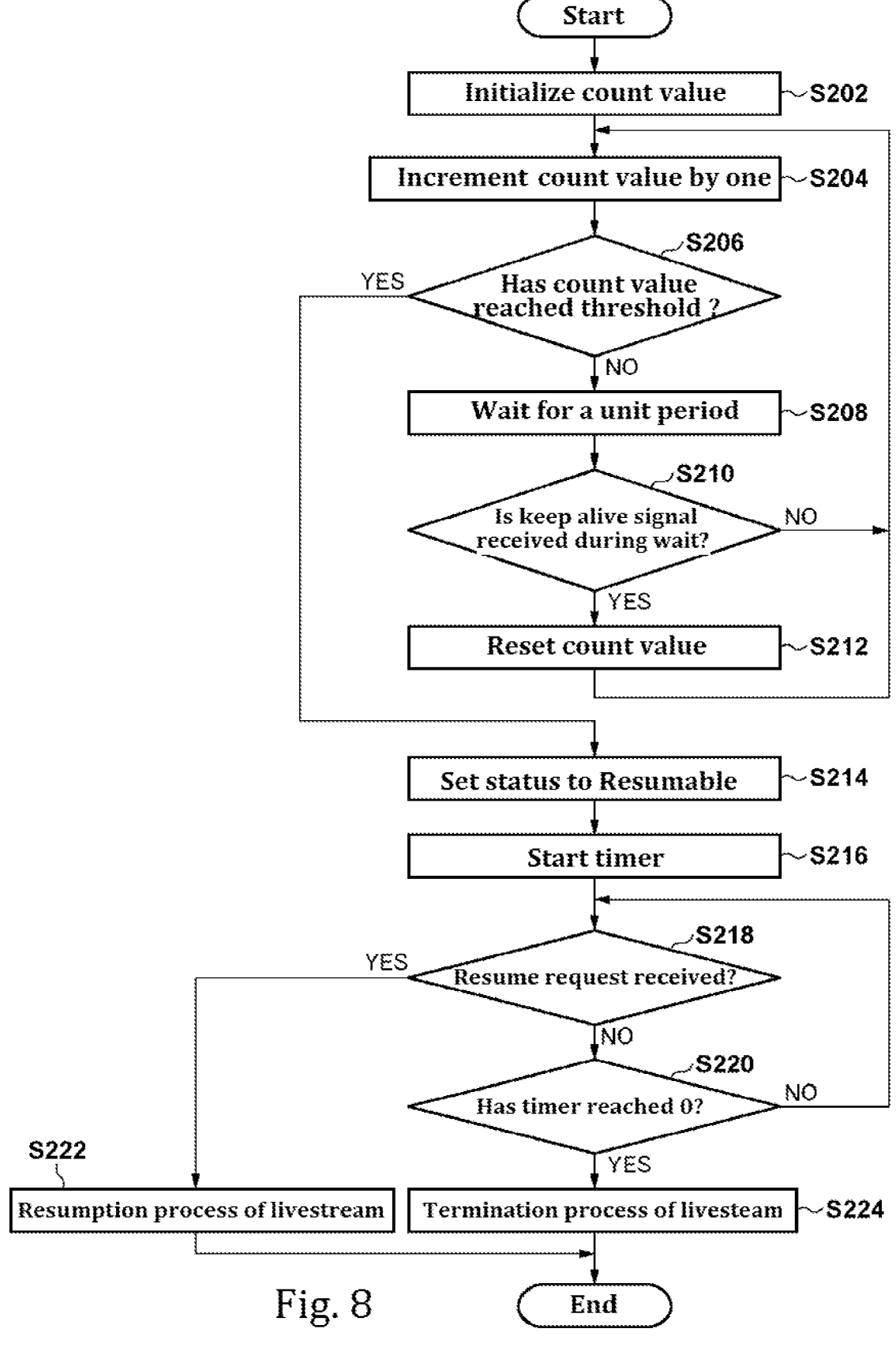
FIG. 8 is a flowchart showing a series of steps of a process performed on a server when a livestream is interrupted for unexpected reasons.

The operation of the livestreaming system 1 with the above configuration will be now described. FIG. 8 is a flowchart showing a series of steps of a process performed on the server 10 when a livestream is interrupted or terminated for unexpected reasons. When a livestream is started in response to a start request received from the livestreamer's user terminal 20, the abnormal determination detection unit 324 initializes the count value for the livestream (S202). The abnormal termination detection unit 324 updates the stream DB 314 so that the count value for the livestream that has started (hereinafter referred to as "target livestream") is set to 0. The abnormal termination detection unit 324 updates the stream DB 314 so that the count value of the target livestream is incremented by one (S204). The abnormal termination detection unit 324 determines whether the count value for the target livestream has reached the threshold value N (S206).

When the count value has not reached the threshold N yet (N in S206), the abnormal termination detection unit 324 waits for a unit period (S208). The length of the unit period may be, for example, 10, 20 or 30 seconds. The length of the unit period may be set to correspond or equal to the transmission interval of the keep alive signal. In other words, the detection may be synchronized with the generation of the keep alive signal. The abnormality termination detection unit 324 determines whether the keep alive signal is received from the user terminal 20 of the livestreamer of the target livestream during the wait in step S208 (S210). When not received (N in S210), the abnormal termination detection unit 324 accesses the stream DB 314 and sets the status of the target livestream to "Unstable". The process then returns to step S204. Whereas when received (Y in S210), the abnormal termination detection unit 324 accesses the stream DB 314 to reset the count value for the target livestream and set the status of the livestream to "Streaming" (S212). For example, the abnormal termination detection unit 324 updates the stream DB 314 so that the count value for the target livestream is set to 0. The process then returns to step S204. Steps S202 to S212 are one form of implementing the idea of setting up a counter that is incremented every unit period and resetting the counter value when the keep alive signal is received.

When it is determined in step S206 that the count value has reached the threshold (Y in S206), the abnormal termination detection unit 324 accesses the stream DB 314 and sets the status of the target livestream to "Resumable" (S214). The resumption processing unit 326 starts a countdown server-side timer (S216). The initial value of the server-side timer is set to the length of the resumable period (e.g., 10 minutes). The resumption processing unit 326 updates the stream DB 314 so that the value of the server-side timer for the target livestream is set to the initial value.

The resumption processing unit 326 determines whether the resume request is received from the user terminal 20 of the livestreamer of the target livestream (S218). When the resume request has received (Y in S218), the resumption processing unit 326 performs a resumption process of the target livestream (S222). The resumption processing unit 326 reconnects or rejoins the requesting livestreamer to the target livestream. Since the stream ID is unchanged before and after the resumption and there is no change in the states, the states of the target livestream are maintained. In this way, the target livestream is restored.

When no resume request is received in step S218 (N in S218), the resume processing unit 326 determines whether the resumable period has expired (S220). In particular, the resumption processing unit 326 determines whether the server-side timer has reached 0, which is the lower limit. When the server-side timer has not reached 0 (N in S220), the process returns to step S218. Whereas when the server-side timer has reached 0 (Y in S220), the termination processing unit 328 performs a termination process of the target livestream (S224). For example, the termination processing unit 328 discards the status of the target livestream.

Figure 9:
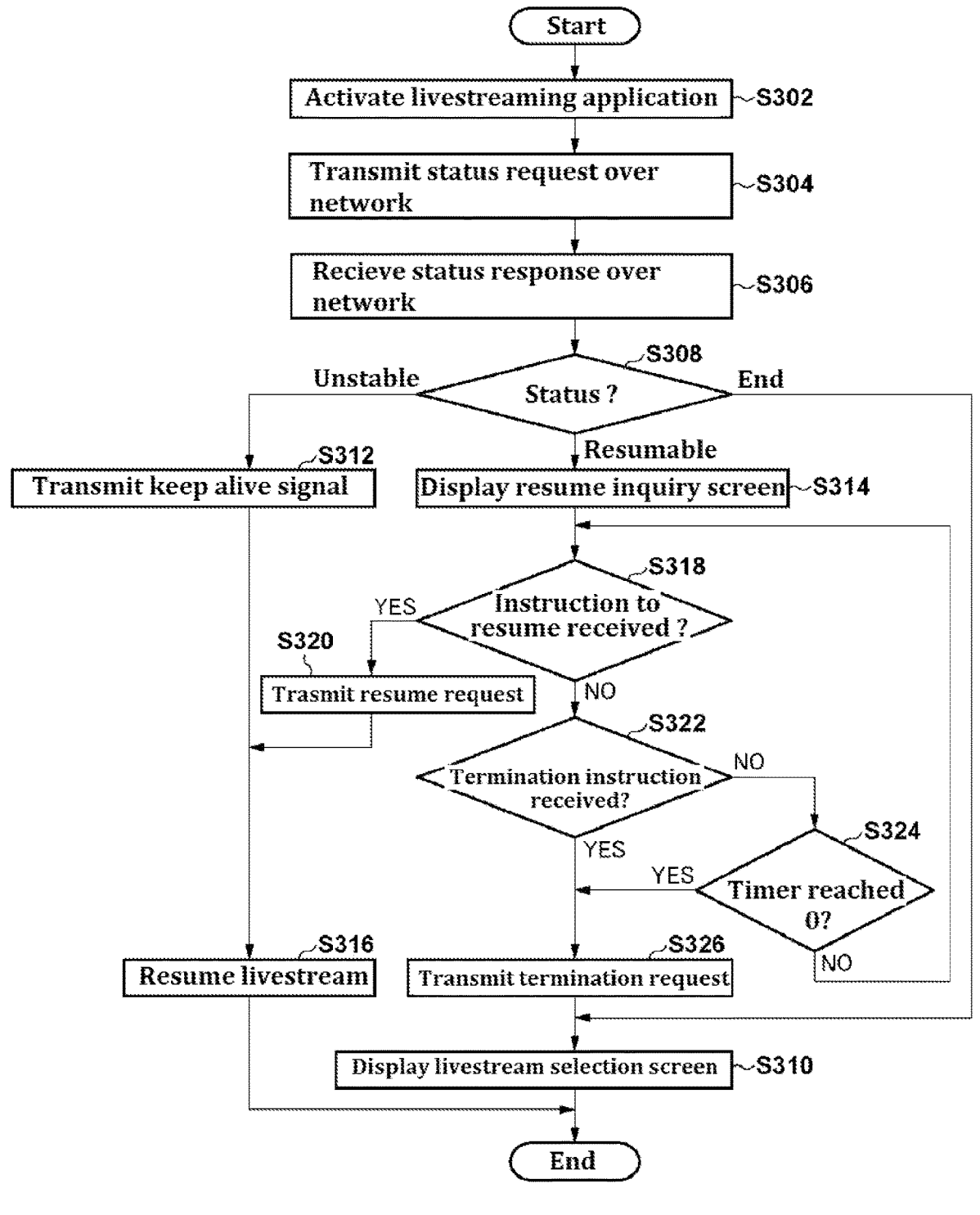
FIG. 9 is a flowchart showing a series of steps of a process on a user terminal when a livestreaming application is activated.

FIG. 9 is a flowchart showing a series of steps of a process on a user terminal when the livestreaming application is activated. The user terminal activates the livestreaming application when an icon of the livestreaming application on the display is selected (S302). The termination mode determination unit 406 generates a status request that includes the user ID of the user terminal user and transmits it to the server 10 over the network NW (S304). The resumption processing unit 326 of the server 10 identifies, in the stream DB 314, an entry with the livestreamer ID that corresponds to the user ID included in the received status request. The resumption processing unit 326 generates a status response that includes the stream ID and status of the identified entry and transmits it to the requesting user terminal. When the status is "Resumable," the status response includes the value of the server-side timer. When the resumption processing unit 326 fails to identify the entry, that is, when the user ID included in the status request cannot be found in the livestreamer IDs registered in the stream DB 314, the resumption processing unit 326 generates a status response that includes the status "End" and transmits it to the requesting user terminal. The termination mode determination unit 406 of the user terminal receives the status response over the network NW (S306).

The termination mode determination unit 406 detects the status included in the status response received in step S306 (S308). When the status is "Unstable" (unstable in S308), the livestreamer-side communication unit 110 transmits the keep alive signal to the server 10 (S312). When the abnormal termination detection unit 324 of the server 10 receives the keep alive signal, it brings the status of the corresponding livestream back to "Streaming" as described above, and continues the livestream. The user terminal activates the streaming unit 100 and resumes transmission of the video data to the server 10 (S316).

When the status is "End" (end in S308), the out-of-livestream UI control unit 402 displays the livestream selection screen, which is a landing page of the livestreaming application, on the display (S310). On this livestream selection screen, provided is an object that causes a transition to a screen for starting a new livestream. The user can start a new livestream by tapping this object.

When the status is "Resumable" (resumable in S308), the livestream resume unit 410 displays the resume inquiry screen on the display (S314). At the same time, the livestream resume unit 410 starts a countdown application-side timer based on the value of the server-side timer included in the status response received in step S306. The countdown of the application-side timer on the server 10 and the countdown of the application-side timer on the user terminal are set to be synchronized with each other. When an instruction to resume is received on the resume inquiry screen (Y in S318), the livestream resume unit 410 generates a resume request that includes the stream ID included in the status response received in step S306 and transmits it to the server 10 over the network NW (S320). The livestream resume unit 410 activates the streaming unit 100 and resumes transmission of the video data to the server 10 (S316).

When the instruction to resume is not received on the resume inquiry screen (N in S318) and the termination instruction is received (Y in S322), the livestream resume unit 410 generates a termination request that includes the stream ID included in the status response received in step S306 and transmits it to the server 10 over the network NW (S326). The process thereafter proceeds to step S310.

When no instruction to resume is received on the resume inquiry screen (N of S318) and no termination instruction is received (N of S322), the livestream resume unit 410 determines whether the application-side timer has reached 0, which is the lower limit. When the application-side timer has not reached 0 (N in S324), the process returns to step S318. Whereas when the application-side timer has reached 0 (Y in S324), the process proceeds to step S326.

Figure 10:
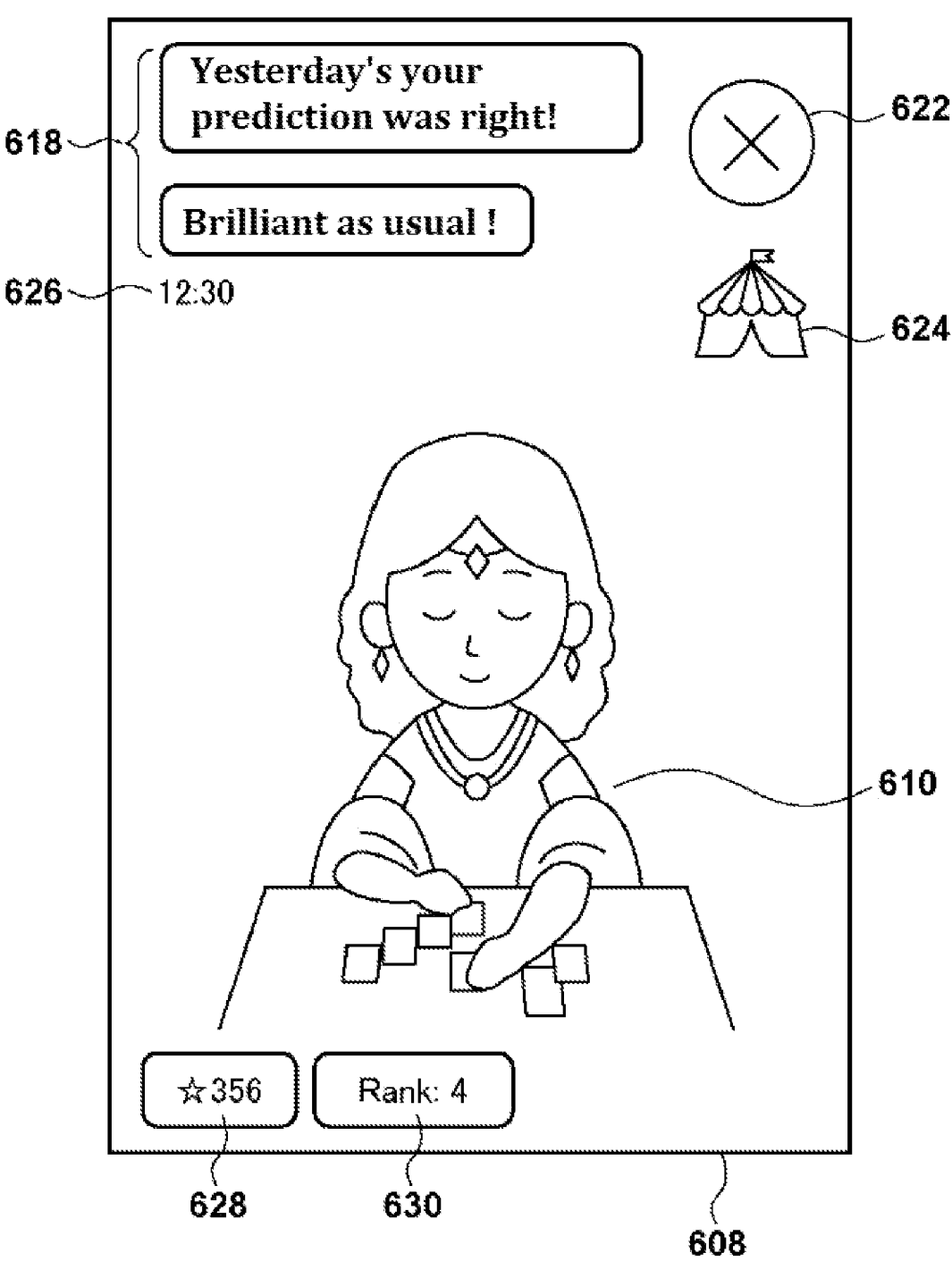
FIG. 10 is a representative screen image of a livestreaming room screen displayed on the display of the livestreamer's user terminal.

FIG. 10 is a representative screen image of the livestreaming room screen 608 shown on the display of the livestreamer's user terminal 20. The livestreaming room screen 608 displays a video image generated by the user terminal 20 of the livestreamer in real time. The livestreaming room screen 608 includes a video image 610 of the livestreamer, a comment display region 618, a streaming end button 622, an event icon 624 representing an event in which the livestreamer is participating, a streaming time display region 626 that displays the streaming time in text, a score display region 628 that displays the score of the livestream, and a cheer rank display region 630 that displays the place in the ranking of the number of cheers for the livestream. The livestreaming room screen 608 is generated by the livestreamer-side UI control unit 108 superimposing other objects on the video image 610.

The comment display zone 718 may include a comment(s) entered by the viewer and a notification(s) from the system. The notifications from the system include information but who gave which gift to the distributor. The livestreamer-side UI control unit 108 generates the comment display region 618 including comments of other viewers received from the server 10 and notifications from the system, and the livestreamer-side UI control unit 108 includes the generated comment display region 618 in the livestreaming room screen 608. The comments displayed in the comment display region 618 are also registered and stored in the corresponding comment history in the stream DB 314.

The streaming end button 622 is an object for accepting an instruction from the livestreamer to terminate the livestream. When the livestreamer-side communication unit 110 detects a tap or click on the streaming end button 622, it generates a termination request that includes the stream ID of the livestream and transmits it to the server 10 over the network NW. As described above, when the server 10 receives the termination request, the server 10 normally terminates the livestream. In this case, the status of the normally terminated livestream is discarded and cannot be resumed later.

The livestreamer-side communication unit 110 refers to the stream DB 314 over the network NW to acquire the states of the livestream shown on the livestreaming room screen 608. The livestreamer-side UI control unit 108 generates the event icon 624, streaming time display region 626, score display region 628, and cheered rank display region 630 based on the acquired states.

Figure 11:
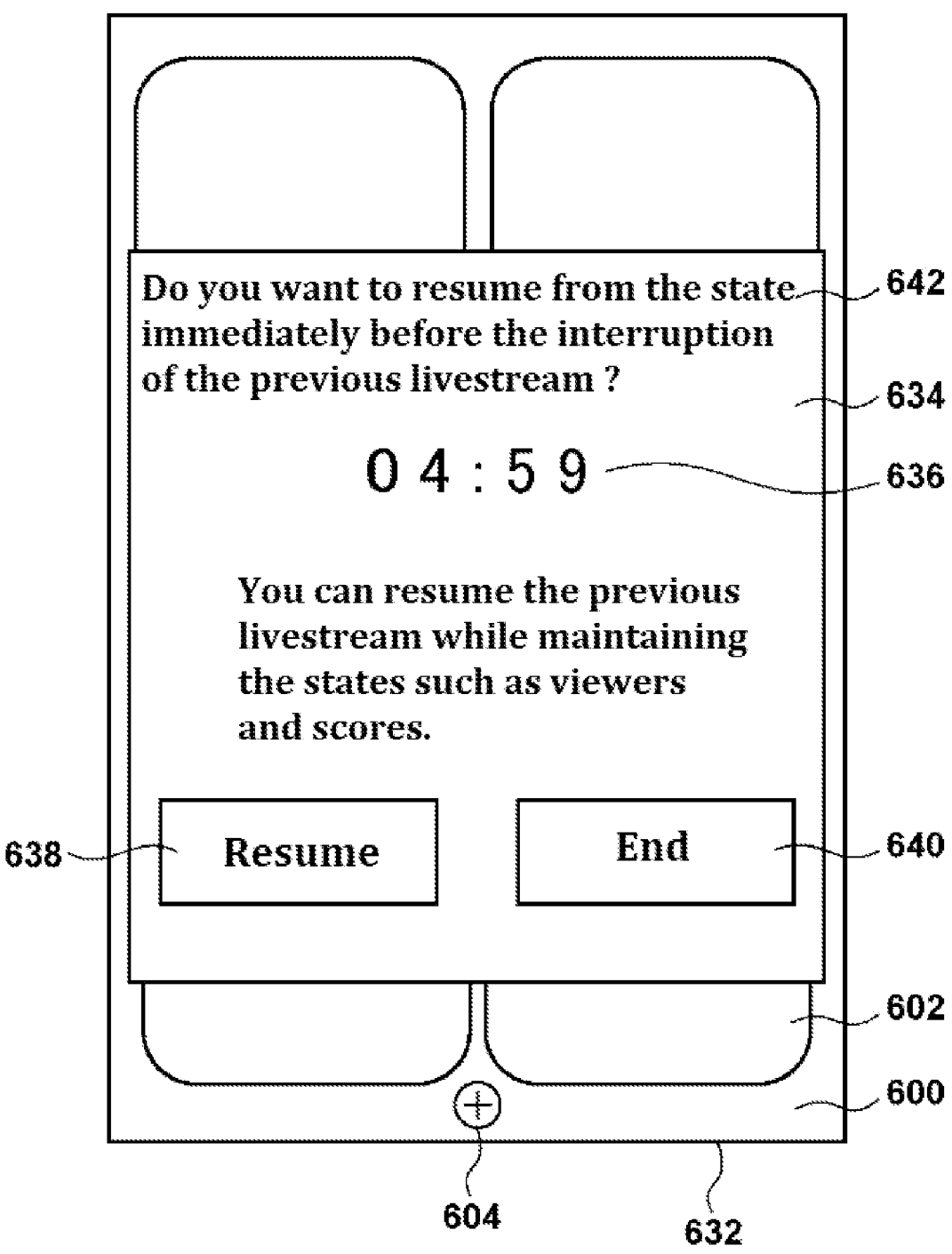
FIG. 11 is a representative screen image of a resume inquiry screen displayed on the display of the livestreamer's user terminal.

FIG. 11 is a representative screen image of a resume inquiry screen 632 displayed on the display of the livestreamer's user terminal 20. Suppose that the livestreaming application is forcibly terminated on the livestreamer's user terminal 20 when the livestream shown the livestreaming room screen 608 of FIG. 10 is being performed. Then, the livestreaming room screen 608 is no longer displayed. When the livestreamer then restarts the livestreaming application on the user terminal 20, a resume inquiry screen 632 shown in FIG. 11 is displayed.

The resume inquiry screen 632 is a screen on which a resume inquiry dialog 634 is superimposed on a livestream selection screen 600, which is the landing page of the livestreaming application. The livestream selection screen 600 includes a thumbnail 602 representing each livestream in the list of currently available livestreams received from the server 10, and a livestream start button 604 to accept an instruction from the user to start a new livestream. When the livestream starting unit 408 detects a tap or click on the livestream start button 604, it generates a start request including the user ID of the user and transmits it to the server 10 over the network NW.

The resume inquiry dialog 634 has a text 642 that inquires whether to resume the previous livestream, a remaining time display region 636 that displays the remaining time, which is the current value of the application-side timer, a resume button 638 to accept an instruction to resume, and an end button 640 for accepting a termination instruction. The remaining time displayed in the remaining time display region 636 is updated every second.

As described above with reference to FIG. 8, when the resumable period expires without receiving the resume request, the entry for the livestream that was interrupted or terminated for unexpected reasons is removed from the stream DB 314. Thus, the resume inquiry screen 632 is shown on the display only within the resumable period after the previous livestream is terminated for unexpected reasons.

Figure 12:
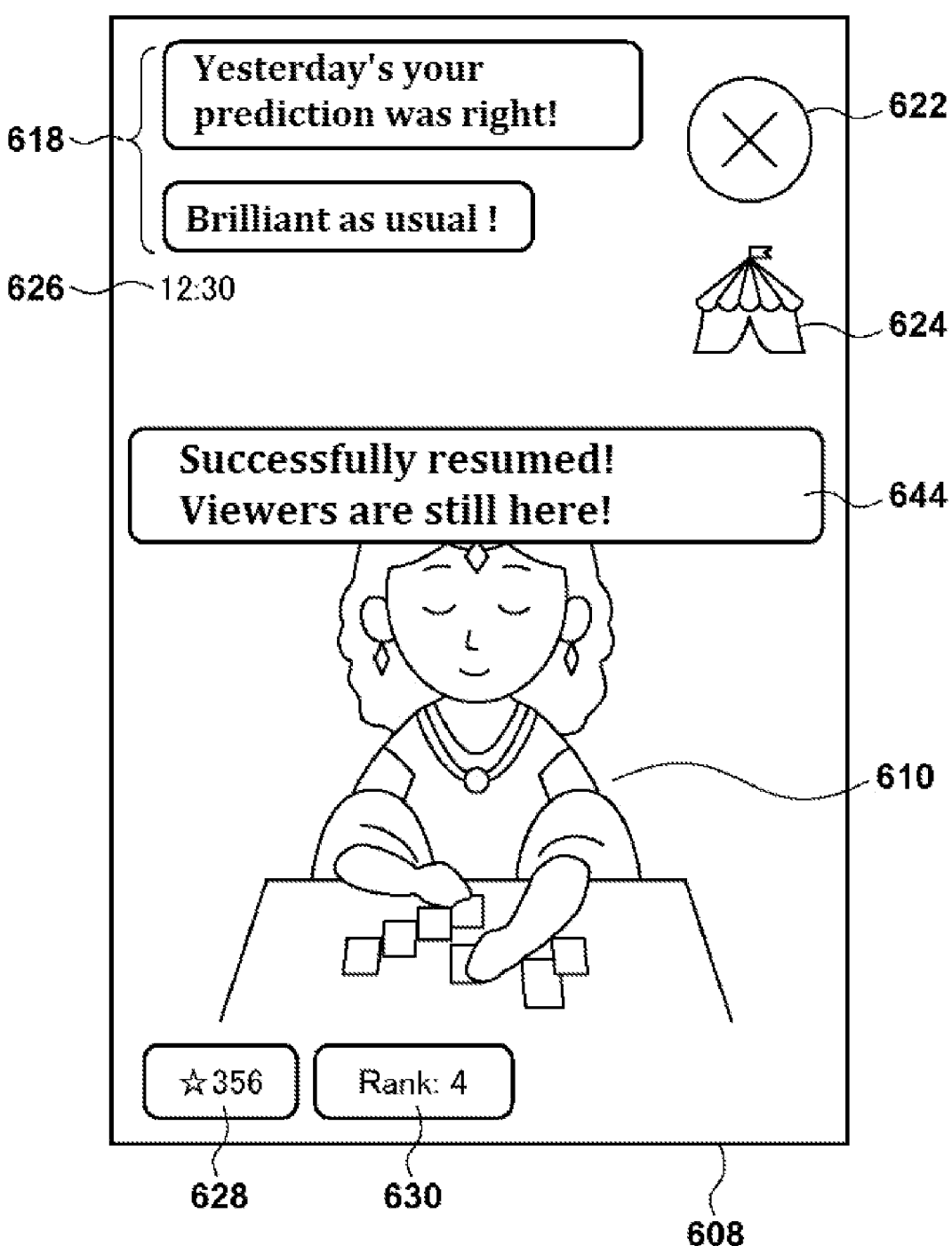
FIG. 12 is a representative screen image of a livestreaming room screen having a successfully resumed message display region superimposed thereon, which is shown on the display of the livestreamer's user terminal.

When the resume button 638 is tapped or clicked on the resume inquiry screen 632 of FIG. 11, the livestream resume unit 410 generates the resume request and transmits it to the server 10. Upon receipt of the resume request by the server 10, the livestream corresponding to the livestreaming room screen 608 of FIG. 10 is resumed. FIG. 12 is a representative screen image of the livestreaming room screen 608 having a successfully resumed message display region 644 superimposed thereon, which is shown on the display of the livestreamer's user terminal 20. FIG. 12 shows the livestreaming room screen 608 on the livestreamer's user terminal 20 immediately after the livestream has resumed. The livestreamer-side UI control unit 108 superimposes the successfully resumed message display region 644 on the livestreaming room screen 608. The contents of the comment display region 618, the participating event represented by the event icon 624, the streaming time represented by the streaming time display region 626, the score represented by the score display region 628, and the placement in the cheered ranking represented by the cheered rank display area 630 shown on the livestreaming room screen 608 of FIG. 12 are all in the states before the forced termination (states in FIG. 10). The viewers also remain participating in the livestream, except for those who actively stopped watching after the forced termination at the livestreamer's user terminal 20.

Figure 13:
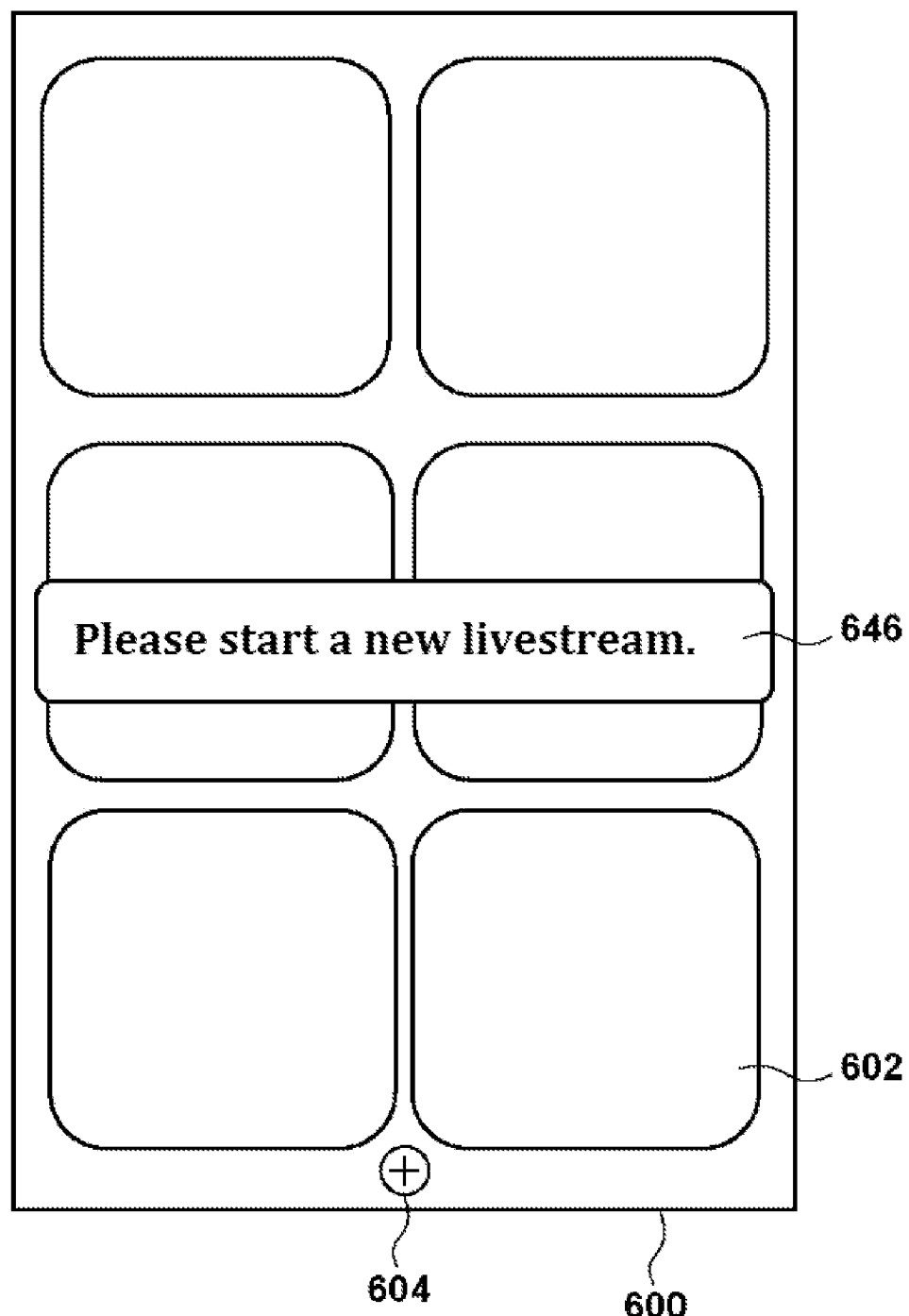
FIG. 13 is a representative screen image of a livestream selection screen having an end message display region superimposed thereon, which is shown on the display of the livestreamer's user terminal.

When the end button 640 is tapped or clicked on the resume inquiry screen 632 of FIG. 11, the livestream resume unit 410 generates the termination request and transmits it to the server 10. Upon receipt of the termination request by the server 10, the livestream corresponding to the livestreaming room screen 608 of FIG. 10 is terminated. FIG. 13 is a representative screen image of the livestream selection screen 600 having a termination message display region 646 superimposed thereon, which is shown on the display of the livestreamer's user terminal 20. FIG. 13 shows the livestream selection screen 600 on the livestreamer's user terminal 20 immediately after the livestream has been terminated. The out-of-livestream UI control section 402 superimposes the termination message display region 646 on the livestreaming room screen 600. Also when the application-side timer reaches 0 without either the resume button 638 or the end button 640 being selected on the resume inquiry screen 632 of FIG. 11, the livestream is terminated and the livestream selection screen 600 of FIG. 13 is shown on the display.

Figure 14:
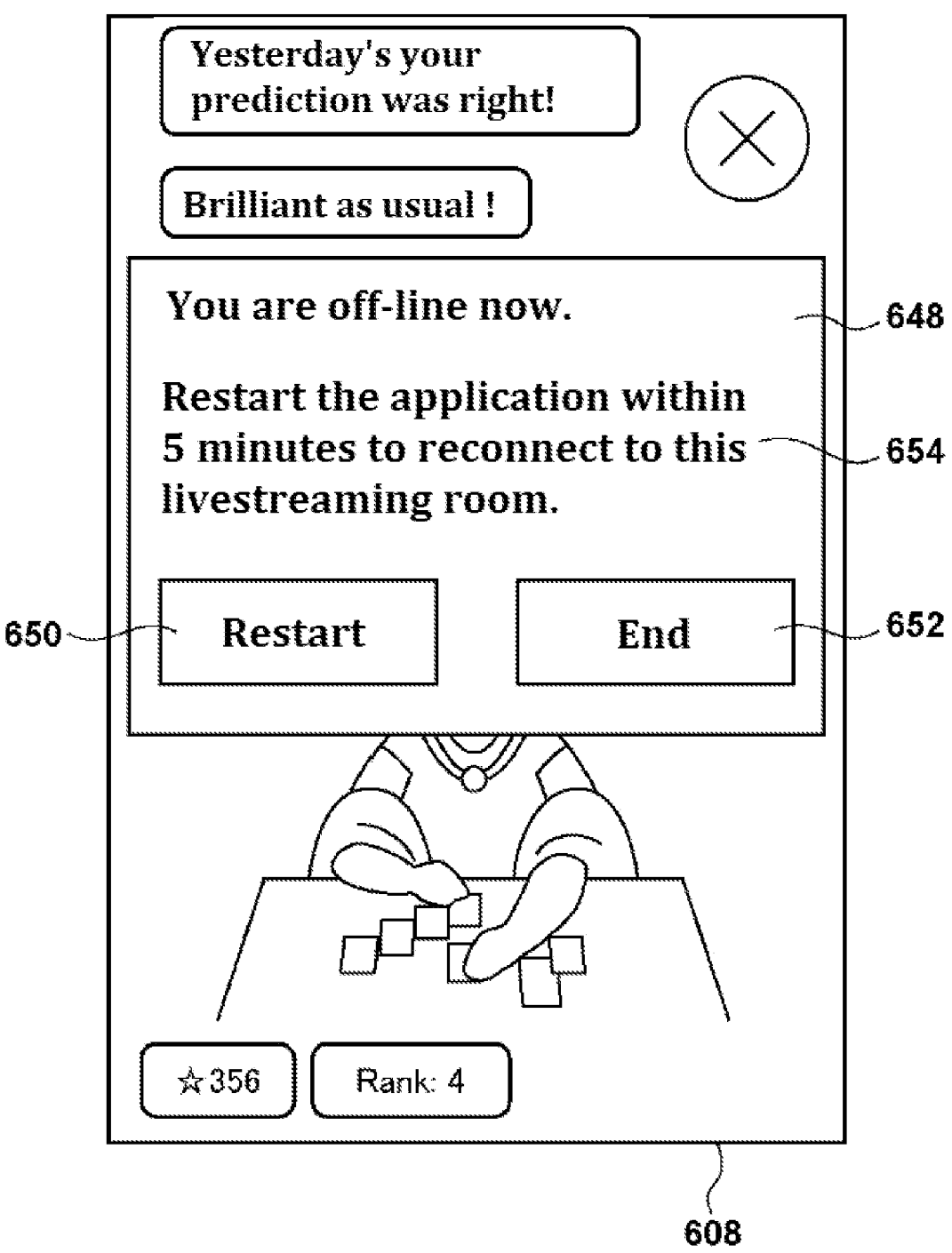
FIG. 14 is a representative screen image of the livestreaming room screen on which a restart inquiry region is superimposed, which is shown on the display of the livestreamer's user terminal.

FIG. 14 is a representative screen image of the livestreaming room screen 608 on which a restart inquiry region 648 is superimposed, which is shown on the display of the livestreamer's user terminal 20. When a failure in the network NW or the server 10 occurs while the livestreamer is livestreaming through the user terminal 20, the livestream is terminated unexpectedly although the livestreaming application is running normally at the livestreamer's user terminal 20. For example, when a failure of the network NW occurs, the video data generated at the livestreamer's user terminal 20 is not delivered to the viewer's user terminal 30, and the viewer's user terminal 30 will not play the video image of the livestreamer. At the same time, on the livestreamer's user terminal 20, the livestreaming application is working normally and transmits the keep alive signal to the server 10, but the keep alive signal does not reach the abnormal termination detection unit 324 due to the failure of the network NW. When this state continues beyond the determination period, the abnormal termination detection unit 324 determines that the livestream has been interrupted for unexpected reasons, and changes the status of the livestream to "Resumable". In this case, even when the network NW is later restored and the keep alive signal reaches the abnormal termination detection unit 324, the livestream cannot be continued as it is. In order to continue the livestream, it is necessary to restart the livestreaming application.

The livestreamer-side communication unit 110 periodically obtains the status of the relevant livestream from the stream DB 314 over the network NW during the livestream. When the obtained status is "Resumable," the livestreamer-side UI control unit 108 superimposes the restart inquiry region 648 on the livestreaming room screen 608. The restart inquiry region 648 includes a text 654 indicating that the livestream is not being performed and that the livestream can be resumed by restarting the livestreaming application within the resumable period, a restart button 650, and an end button 652. When the restart button 650 is tapped or clicked, the out-of-livestream UI control section 402 performs a process to restart the livestreaming application. As a result, the screen is switched to the resume inquiry screen 632 of FIG. 11 when the resumable period has not expired. When the end button 652 is tapped or clicked, the livestream resume unit 410 generates a termination request and sends it to the server 10. The screen is then switched to the livestream selection screen 600 of FIG. 13.

Figure 15:
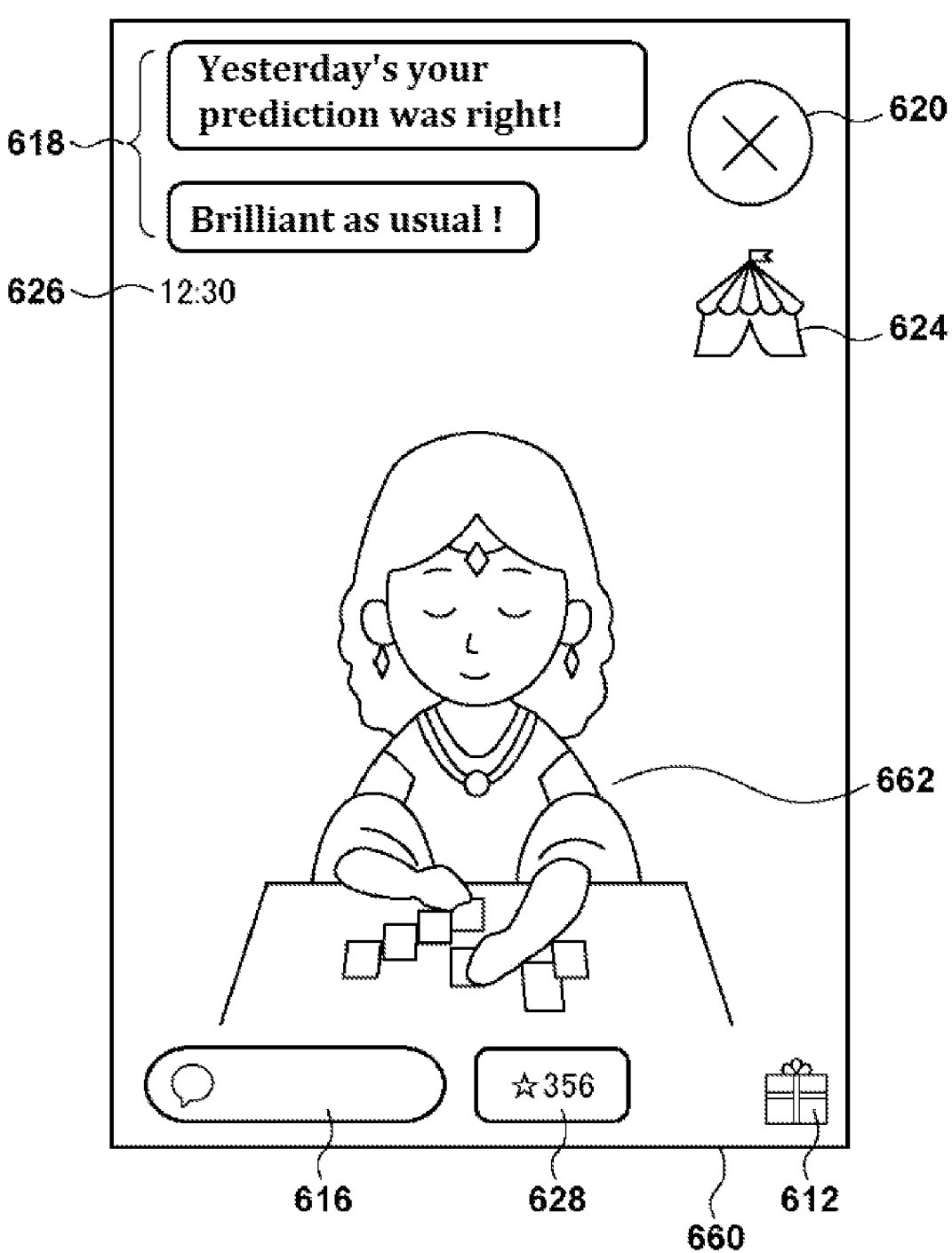
FIG. 15 is a representative screen image of a livestreaming room screen on a display of a viewer's user terminal.

FIG. 15 is a representative screen image of a livestreaming room screen 660 shown on the display of the viewer's user terminal 30. The livestreaming room screen 660 displays a video image generated by the user terminal 20 of the livestreamer in real time. The livestreaming room screen 660 includes a video image 662 of a distributor obtained by reproducing the video data received from the server 10, a gift object 612, a comment input region 616, a comment display region 618, a quit viewing button 620, the streaming time display region 626, the event icon 624, and the score display region 628. The viewer-side UI control unit 202 superimposes these objects on the video image 662 obtained by reproducing the video data to generate the livestreaming room screen 660.

The comment input region 616 receives a comment input by the viewer. The viewer-side communication unit 204 generates a comment input signal that includes the comment entered in the comment input region 616, and transmits the signal to the server 10 over the network NW. At the same time, the viewer-side UI control unit 202 updates the comment display region 618 to display the comment entered in the comment input region 616.

The quit viewing button 620 is an object for accepting an instruction from the viewer to quit viewing the live-stream. The gift object 612 is an object to allow viewers to give gifts to the livestreamer.

Figure 16:
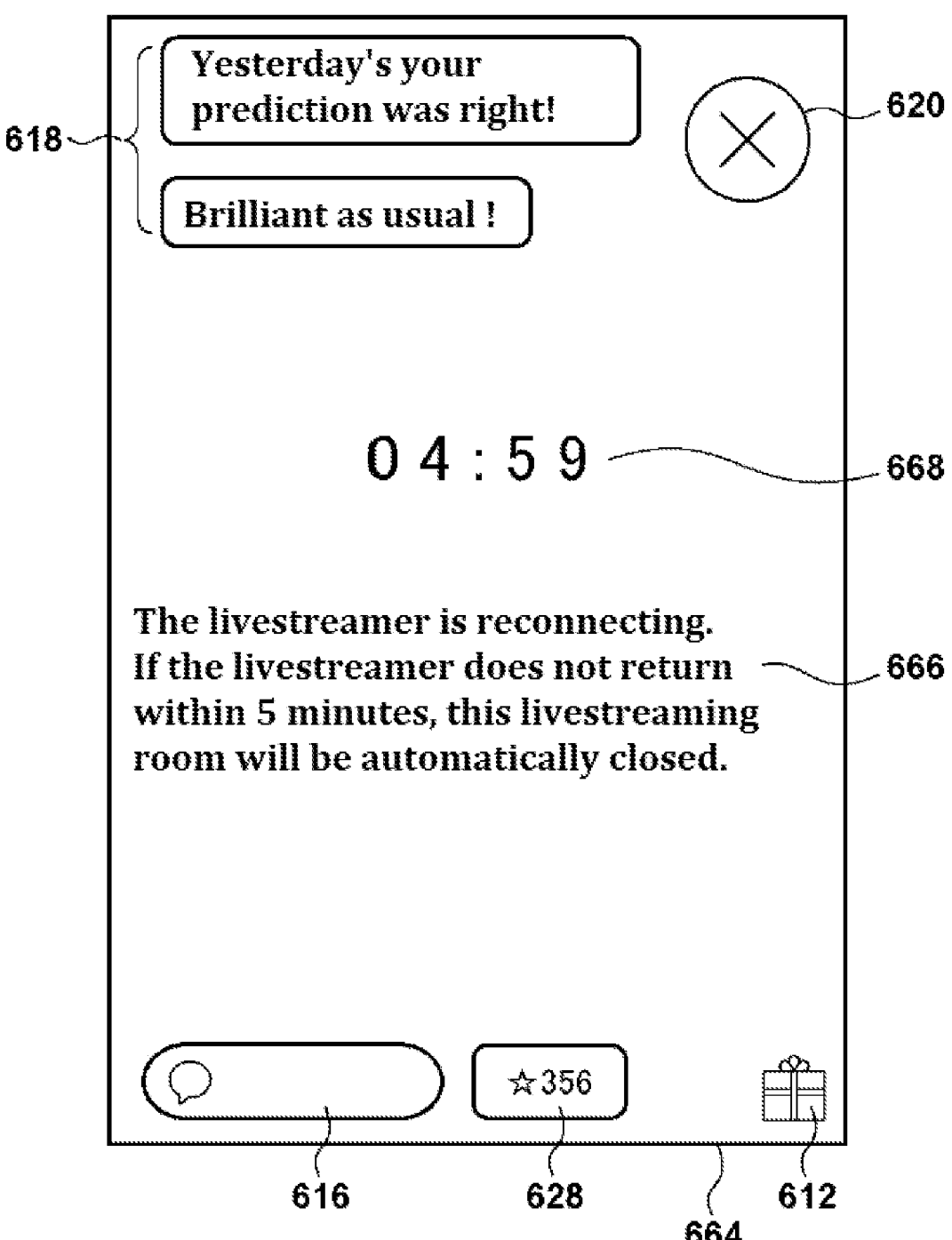
FIG. 16 is a representative screen image of a waiting request screen displayed on the display of the viewer's user terminal.

FIG. 16 is a representative screen image of a waiting request screen 664 displayed on the display of the viewer's user terminal 30. When a viewer is watching a livestream on the livestreaming room screen 660 of FIG. 15 and the livestream is interrupted or terminated for an unexpected reason, the viewer-side communication unit 204 of the user terminal 30 receives a waiting request notification from the server 10. When the waiting request notification is received, the viewer-side UI control unit 202 displays the waiting request screen 664 on the display without terminating the livestream on the viewer's user terminal 30. The waiting request screen 664 includes the comment display region

618, the quit viewing button 620, a remaining time display region 668, a text 666, the comment input region 616, the score display region 628, and the gift object 612. The viewer-side UI control unit 202 stops displaying the video image 662 of the livestreamer because the video data can be no longer received. Instead, the viewer-side UI control unit 202 displays the text 666 indicating that the livestream is interrupted unexpectedly and the livestreamer is trying to resume the livestream together with the remaining time display region 668. The remaining time displayed in the remaining time display region 668 corresponds to the remaining time displayed in the remaining time display region 636 of FIG. 11.

When the remaining time runs out without resuming the livestream, the viewing unit 200 terminates the livestream on the viewer's user terminal 30. When the viewing unit 200 detects a tap or click on the quit viewing button 620 on the waiting request screen 664 while there is still time remaining, it terminates the livestream on the viewer's user terminal 30.

Figure 17:
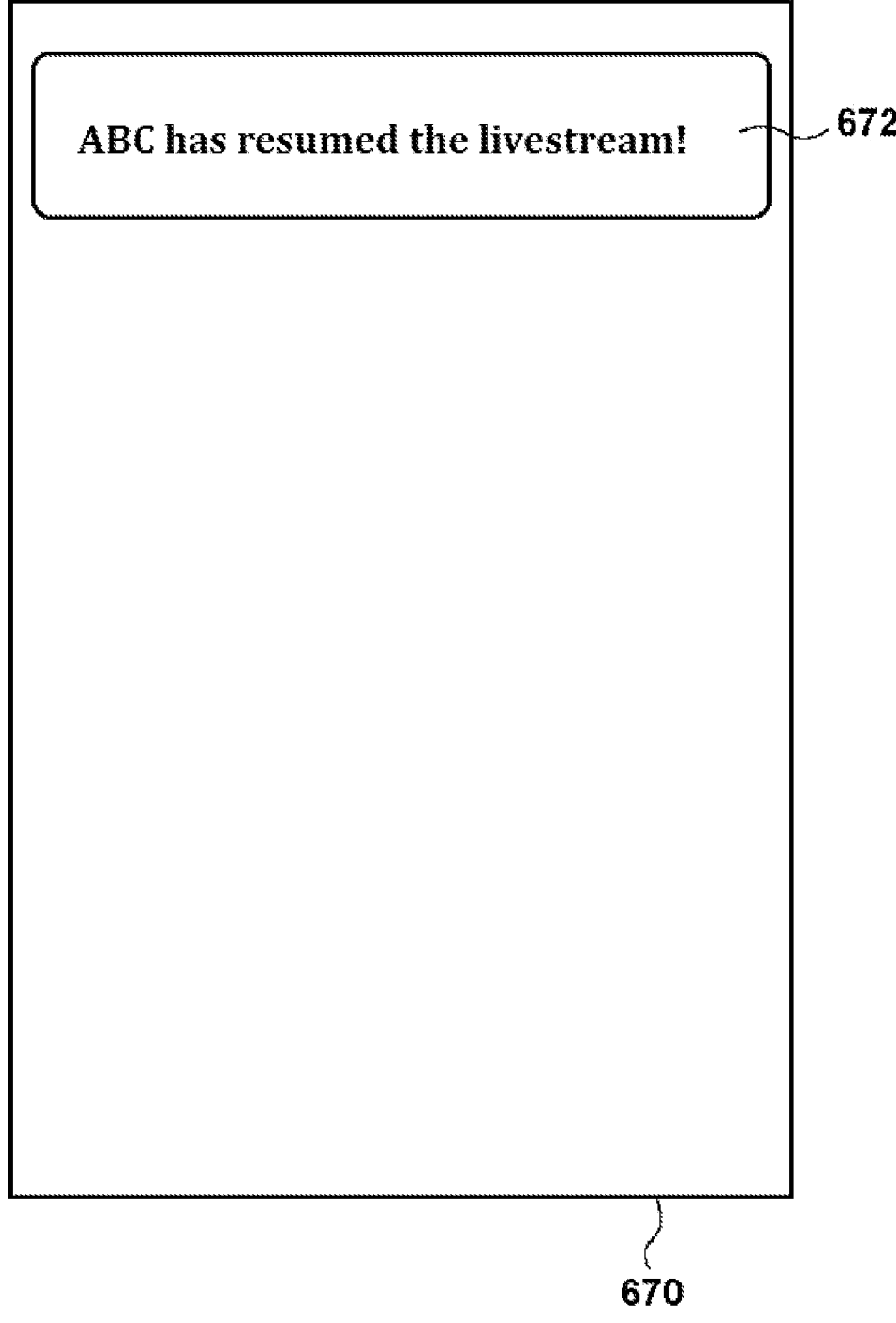
FIG. 17 is a representative screen image of a push notification screen displayed on the display of an active user's user terminal.

FIG. 17 is a representative screen image of a push notification screen 670 displayed on the display of an active user's user terminal. FIG. 17 shows one example of a push notification to inform that the livestream has resumed. The push notification screen 670 includes a push notification display region 672 that displays text indicating that the livestreamer has resumed the livestream, which was interrupted for unexpected reasons. When an active user taps or clicks on the push notification display region 672, the livestreaming room screen of the resumed livestream is displayed.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

According to the livestreaming system 1, even when a livestream is terminated for unexpected reasons such as forced termination of the livestreaming application, the livestreamer can resume the livestream with the viewers, states, and atmosphere of the livestream before the forced termination. This enhances the livestreamer's sense of reliability for the system and provides a more comfortable and fail-safe livestreaming environment.

In particular, when a livestream is provided using portable terminals such as smartphones, forced termination is more likely to occur because they have less processing power and memory capacity than stationary PCs, and connection failures are also more likely to occur because the connection to the network is wireless, such as 4G, 5G, and Wi-Fi. In this situation, the livestreaming system 1 is more suitable because it provides a fail-safe mechanism against interruptions and terminations for unexpected reasons.

The above embodiment does not prevent terminations of the livestream for unexpected reasons, but rather reduces the loss of time when such events occur. In the embodiment, the state of the livestream is maintained so that the livestream can be resumed when the livestreamer is able to return in time.

In addition, when the livestreaming system 1 receives an explicit instruction from the livestreamer to terminate the livestream, the system immediately terminates the livestream without maintaining the state of the livestream, and the state of the livestream is immediately discarded. This reduces the processing load on the server 10 and the required data capacity.

Figure 18:
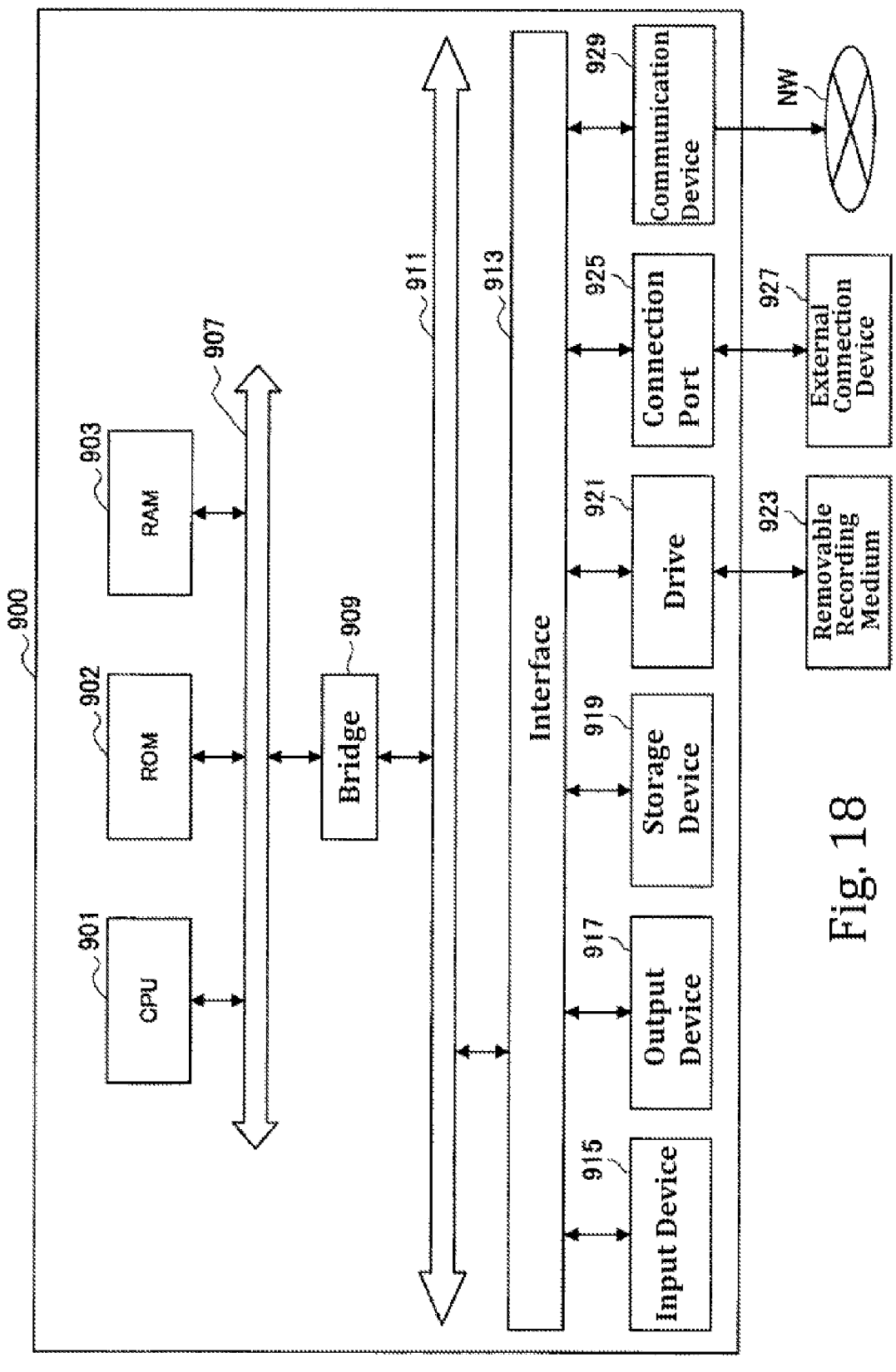
FIG. 18 is a block diagram showing an example of a hardware configuration of the information processing device according to the embodiment.

Referring to FIG. 18, the hardware configuration of an information processing device relating to an embodiment of the disclosure will be now described. FIG. 18 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a processing circuit such as a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device

917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the livestreaming system 1 in the embodiment have been described. This embodiment is merely an example, and it will be understood by those skilled in the art that various modifications are possible by combining the respective components and processes, and that such modifications are also within the scope of the present disclosure.

The embodiment above described the case in which the livestream is resumed as soon as the resume button 638 is selected on the resume inquiry screen 632, however the embodiment is not limited to this case. For example, when the resume button 638 is selected, the user may be redirected to a setting screen for the livestreamer side can configure various settings of the livestream. The setting screen may include a button to start livestream to request resumption. In this case, the server 10 may hold the setting values before the forced termination in the stream DB 314 and automatically restore the setting values on the setting screen. The server 10 may register the setting values in the stream DB314 when starting the livestream in response to the reception of the request to resume the livestream. The server 10 may include the corresponding setting values in the status response. This allows the livestreamer to reduce the time required to re-set the settings and resume the livestream more quickly. The count of the resumable period may advance or be paused during the configuration process on the configuration screen.

In the embodiment, the resumable period may be extended when the viewer gives a gift to the livestreamer during the resumable period. For example, when the viewer uses a gift through the gift object 612 on the waiting request screen 664 of FIG. 16, the server 10 may extend the resumable period by increasing or resetting the server-side timer value.

The return rate of the gift, which indicates the ratio of the reward to be awarded to the price points in the embodiment is merely an example, and the return rate may be appropriately set by the administrator of the live-streaming system 1, for example.

The technical idea according to the embodiment may be applied to live commerce or virtual live-streaming using an avatar that moves in synchronization with the movement of the streamer instead of the image of the streamer.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the streamer's user terminal.

In the above embodiment, the case where when the livestream is terminated for unexpected reasons such as forced termination of the livestreaming application, the system waits for the instruction to resume the livestream while maintaining the state of the livestream has been described, but the embodiment is not limited to this. Situations in which the livestreamer wishes to resume the livestream while maintaining the state of the livestream can also occur during the livestream being delivered.

For example, network congestion, temporary tight memory capacity in user terminals, or increased load on the server may cause the livestream to become chunky (or choppy, the video is reproduced intermittently) or freeze. In such cases, the livestreamer wishes to reconnect or restart the livestream in the hope that the situation will improve. However, with conventional technology, once the livestream is terminated, the previously accumulated scores and other parameters of the livestream and the degree of excitement are reset, and the viewers are also released.

Therefore, this modification example provides a function that enables restart of the livestream during the livestream being performed while maintaining the state of the livestream. "Restart" herein means to terminate the livestream by the livestreamer and to start a new livestream by the same livestreamer. In this modification example, the same mechanism as described in the above embodiment is used to enable the states of the livestream before the restart to be carried over to the livestream after the restart. This allows the livestreamer to improve the quality of the livestream by restarting a livestream while maintaining the states of the livestream.

Figure 19:
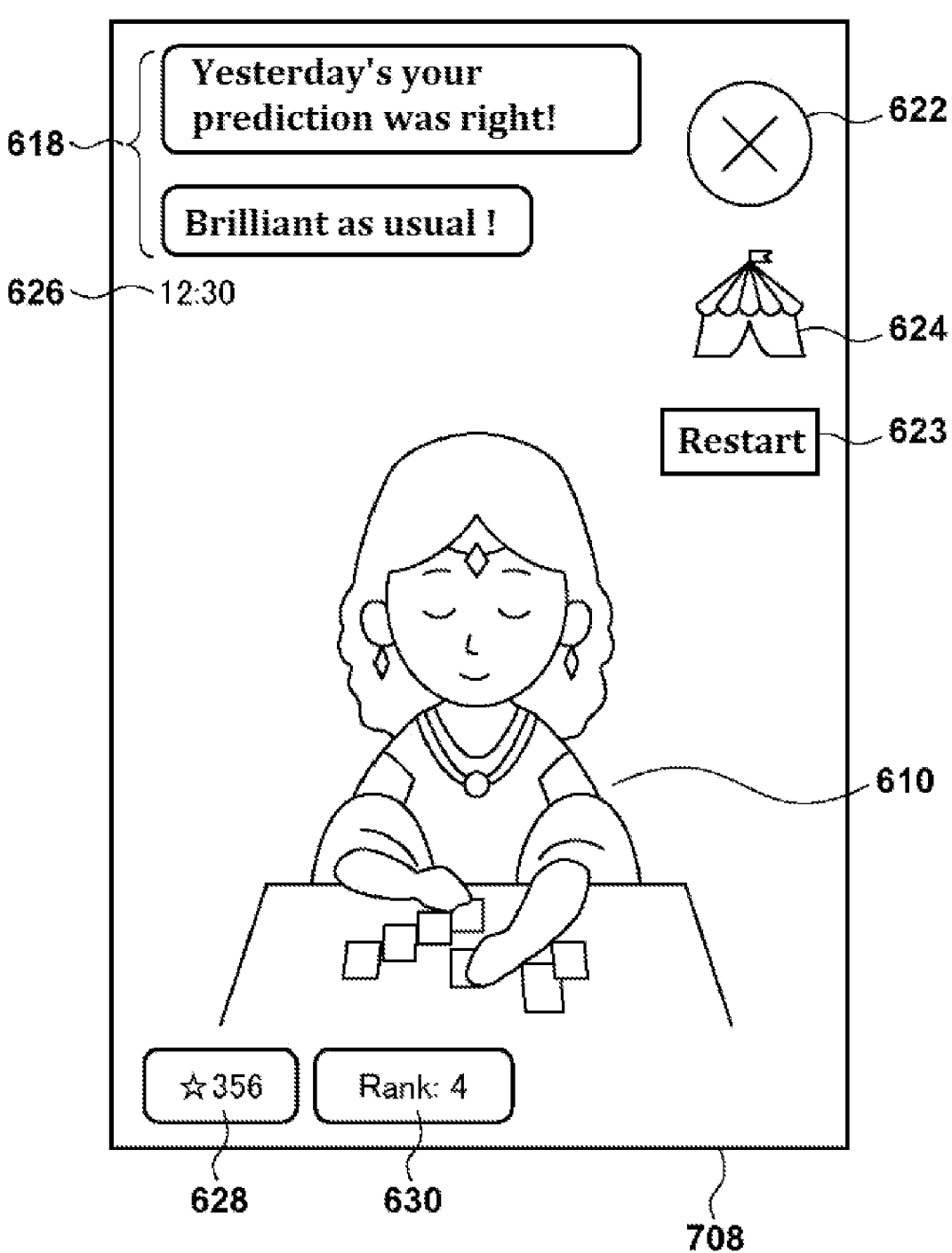
FIG. 19 is a representative screen image of the livestreaming room screen of a modification example shown on the display of a livestreamer's user terminal.

FIG. 19 is a representative screen image of a livestreaming room screen 708 of a modification example shown on the display of the livestreamer's user terminal 20. The livestreaming room screen 708 includes a restart button 623. When the user terminal 20 detects a tap on the restart button 623, it generates a restart request including the stream ID of the livestream being performed by the livestreamer and transmits it to the server 10 over the network NW. When the server 10 receives the restart request from the livestreamer's user terminal 20, it terminates the livestream identified by the stream ID included in the restart request. At this time, the server 10 maintains the state of the livestream registered in the stream DB314. The server 10 does not remove the entry for the terminated livestream. This can be said that the state of the livestream is maintained. The server 10 restarts the terminated livestream such that the state of the livestream is carried over from the livestream immediately before the termination. The server 10 resumes receiving the video data from the user terminal 20 from which the restart request was sent, and transmits the received video data to the user terminal 30 of the viewer of the livestream to be restarted.

The above modification example describes the case where the restart button is provided on the livestreaming room screen, but it is not limited to this case. For example, a restart button may be added to a pop-up screen that appears after the streaming end button 622 is tapped, to confirm the termination of the livestream. Or, again, when the livestream is detected to be chunky or frozen at the user terminal 20, a pop-up may be shown to inquire whether to restart the livestream.

What is claimed is:

1. A server, comprising:
a processor;
a network communication interface connected to a network; and
a storage medium that stores a program, wherein
when the processor executes the program, the processor is configured to:
cause the network communication interface to transmit a video data related to a livestream from a terminal of a livestreamer of the livestream to a terminal of a viewer via the network;
cause the network communication interface to receive, over the network and from the terminal of the livestreamer, a keep-alive signal that is generated at the terminal of the livestreamer at certain intervals during the livestream;
increment a counter every unit period; and
reset a counter value of the counter when the keep-alive signal is received from the terminal of the livestreamer by the network communication interface,
wherein the processor is further configured to change a status of the livestream from a first status to a second status when the network communication interface fails to receive the keep-alive signal and to change the status of the livestream from the second status to the first status when the keep-alive signal is recovered.

2. The server according to claim 1, wherein
the processor is further configured to, change the status of the live stream from the second status to a third status when the counter value reaches a threshold.

3. A server, comprising:
a processor;
a network communication interface connected to a network; and
a storage medium that stores a program, wherein
when the processor executes the program, the processor is configured to:
cause the network communication interface to transmit a video data related to a livestream from a terminal of a livestreamer of the livestream to a terminal of a viewer via the network;
cause the network communication interface to receive, over the network and from the terminal of the livestreamer, a keep-alive signal that is generated at the terminal of the livestreamer at certain intervals during the livestream;
increment a counter every unit period; and
reset a counter value of the counter when the keep-alive signal is received from the terminal of the livestreamer by the network communication interface,
wherein the processor is further configured to start a countdown timer when the counter value reaches a threshold, and to terminate the livestream when the countdown timer reaches a lower limit, terminate the livestream.

4. A method, including:
transmitting a video data related to a livestream from a terminal of a livestreamer of the livestream to a terminal of a viewer;
receiving, over a network and from the terminal of the livestreamer, a keep-alive signal that is generated at the terminal of the livestreamer at certain intervals during the livestream;
setting a counter to increment every unit period;
resetting a counter value of the counter when the keep-alive signal is received from the terminal of the livestreamer; and
changing a status of the livestream from a first status to a second status when there is a failure to receive the keep-alive signal and changing the status of the livestream from the second status to the first status when the keep-alive signal is recovered.

* * * * *